US007676737B2

(12) United States Patent
Kaneko

(10) Patent No.: US 7,676,737 B2
(45) Date of Patent: *Mar. 9, 2010

(54) SYNCHRONIZATION MECHANISM AND THE IMPLEMENTATION FOR MULTIMEDIA CAPTIONING AND AUDIO DESCRIPTIONS

(75) Inventor: Masahiko Kaneko, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1987 days.

This patent is subject to a terminal disclaimer.

(21) Appl. No.: 10/412,805

(22) Filed: Apr. 10, 2003

(65) Prior Publication Data

US 2004/0205830 A1    Oct. 14, 2004

(51) Int. Cl.
*G06F 17/00*    (2006.01)
*H04N 7/10*    (2006.01)
*H04N 7/16*    (2006.01)
(52) U.S. Cl. .................. 715/203; 715/201; 715/202; 725/32; 725/137
(58) Field of Classification Search ......... 715/201–203; 725/9, 37, 40, 32, 137
See application file for complete search history.

(56) References Cited

U.S. PATENT DOCUMENTS

| | | | |
|---|---|---|---|
| 5,805,173 A * | 9/1998 | Glennon et al. ............. | 345/501 |
| 6,240,555 B1 * | 5/2001 | Shoff et al. ................. | 725/110 |
| 6,393,158 B1 * | 5/2002 | Gould et al. ................ | 382/254 |
| 6,460,180 B1 | 10/2002 | Park | |
| 6,483,568 B1 | 11/2002 | Folio | |
| 6,493,291 B2 | 12/2002 | Nagano | |
| 6,615,270 B2 | 9/2003 | Gould et al. | |
| 6,621,980 B1 | 9/2003 | Gould et al. | |
| 6,637,032 B1 * | 10/2003 | Feinleib ..................... | 725/110 |
| 6,698,020 B1 * | 2/2004 | Zigmond et al. ............ | 725/34 |

(Continued)

FOREIGN PATENT DOCUMENTS

JP    2000253312    9/2000

(Continued)

OTHER PUBLICATIONS

Babaguchi, N., et al, "Event Based Indexing of Broadcasted Sports Video by Intermodal Collaboration," *IEEE Transactions on Multimedia* 4(1):68-75, Mar. 2002.

(Continued)

*Primary Examiner*—Laurie Ries
*Assistant Examiner*—Chau Nguyen
(74) *Attorney, Agent, or Firm*—Workman Nydegger

(57) ABSTRACT

A system for outputting a media stream and supplemental media streams is provided. A media stream manager outputs the media stream and associated supplemental media streams on a media stream output device. A timing module generates triggering events in conjunction with the output of the media streams according to event data. The media stream manager monitors for and detects the triggering events during the output of the media streams. Upon detecting a triggering event, the media stream manager determines which supplemental media streams are associated with the triggering event and iteratively outputs each associated supplemental media stream to the media stream output device. Supplemental media streams are output either synchronously or asynchronously according to previously determined information. A supplemental media stream that is output asynchronously to the media stream suspends the media stream and the timing of the media stream while the supplemental media stream is output.

68 Claims, 16 Drawing Sheets

U.S. PATENT DOCUMENTS

| | | | |
|---|---|---|---|
| 7,100,193 | B2 | 8/2006 | Hassell |
| 7,376,414 | B2 | 5/2008 | Engstrom |
| 7,454,776 | B1 * | 11/2008 | Walker et al. ............... 725/122 |
| 2002/0007493 | A1 | 1/2002 | Butler |
| 2002/0008703 | A1 * | 1/2002 | Merrill et al. ............... 345/473 |
| 2002/0042920 | A1 | 4/2002 | Thomas |
| 2002/0048448 | A1 | 4/2002 | Daniels |
| 2003/0070169 | A1 * | 4/2003 | Beyers et al. ................. 725/51 |
| 2004/0128702 | A1 | 7/2004 | Kaneko |
| 2008/0184297 | A1 | 7/2008 | Ellis |

FOREIGN PATENT DOCUMENTS

| | | |
|---|---|---|
| JP | 2000278622 | 10/2000 |
| WO | 9512275 | 5/1995 |

OTHER PUBLICATIONS

Hoschka, P. (ed.), "Synchronized Multimedia Integration Language (SMIL) 1.0 Specification," *W3C Recommendation*, World Wide Web Consortium, Jun. 15, 1998, <http://www.w3.org/TR/REC-smil-19980615> [retrieved Nov. 22, 2002].

"RealSystem Release 8," *Real Text Authoring Guide*, RealNetworks, Inc., Dec. 15, 2000, <http://service.real.com/help/library/guides/realtext/htmfiles/notice.htm> [retrieved Nov. 15, 2002].

Suzuki, T., et al., "Enhancement of VCML Player," *IEEE*, 2001, pp. 365-370.

Noldus, L.P.J.J., et al., "The Observer Video-Pro: New Software for the Collection, Management, and Presentation of Time-Structured Data From Videotapes and Digital Media Files," *Behavior Research Methods, Instruments, & Computers 2000*, 32(1):197-206.

Office Action dated Jun. 27, 2007 cited in U.S. Appl. No. 10/330,422.

Office Action dated Jan. 10, 2008 cited in U.S. Appl. No. 10/330,422.

Office Action dated Aug. 21, 2008 cited in U.S. Appl. No. 10/330,422.

Office Action dated Mar. 4, 2009 cited in U.S. Appl. No. 10/330,422.

Notice of Allowance dated Sep. 4, 2009 cited in U.S. Appl. No. 10/330,422.

\* cited by examiner

US 7,676,737 B2

SYNCHRONIZATION MECHANISM AND THE IMPLEMENTATION FOR MULTIMEDIA CAPTIONING AND AUDIO DESCRIPTIONS

FIELD OF THE INVENTION

The present invention relates to a method for displaying supplemental media streams designed to assist visually and hearing-impaired people in conjunction with a main multimedia stream.

BACKGROUND OF THE INVENTION

There are many people who have access to multimedia but are unable to fully appreciate the content delivered by the multimedia due to impairments to of one of their senses, such as sight or hearing. For example, a person who is hearing impaired may have access to a multimedia content stream having both video and audio aspects, yet can perceive only the video aspect of the content. Likewise, visually impaired persons may have access to a multimedia content stream having both video and audio aspects, yet can perceive only the audio aspects of the content.

Captioning is a supplemental media stream useful in assisting those who are hearing impaired, and has been an industry staple for television programs for many years. The notion of captioning has expanded beyond television broadcasts to other platforms, in particular to computer-delivered multimedia streams. Companies such as Apple and RealNetworks have products that enable content authors to include supplemental captioning streams with end products using proprietary captioning formats. These formats are generally based on W3C's Synchronized Multimedia Integration Language.

One key drawback of current systems for integrating supplemental media streams with main multimedia streams is that the information needed to adequately supplement a main media stream often cannot keep pace with the main media stream. Often, due to the nature of the supplemental media streams, presenting all of the information necessary to adequately supplement the main media stream requires more time than the main media stream allows. As a consequence, content authors must selectively omit some information that would otherwise be included in the supplemental stream, in order to keep pace with the main media stream.

As an example of the foregoing problem, captioning typically displays, in textual format, the dialog of the characters on the screen. Sounds of events that occur off-screen that influence the speech of those characters, such as a scream or sounds of a collision in the background, might need to be omitted in order to capture all of the dialog of the present characters. Ideally, there would be a description of the sound that so influences the speech of those characters. However, because the dialog of the characters continues, it is often necessary to omit such descriptions. In addition, supplemental media from one scene often "spill over" into the following scene, creating some confusion as to what is currently occurring in the main media stream.

What is needed is a system for supplying supplemental media streams along with a main media stream and selectively pausing the main media stream to permit the supplemental media stream to fully present the content associated with a particular event. Additionally, the system should suspend the timing of the main media stream upon which the supplemental media streams are based so that the timing of the supplemental media streams are not affected by pauses in the main media stream.

SUMMARY OF THE INVENTION

In accordance with this invention, a main media stream and at least one supplemental media stream are output. Triggering events are generated in conjunction with the output of the main media stream. A media stream manager obtains the main media stream and outputs the main media stream on a media stream output device. In addition, the media stream manager monitors for and detects the triggering events generated during the output of the main media stream. The triggering events are generated according to event data and in conjunction with the timing of the output of the main media stream. Upon detecting a triggering event, the media stream manager determines which of the supplemental media streams are associated with the triggering event and iteratively outputs each associated supplemental media stream via the media stream output device. Each associated supplemental media stream may be output either synchronously or asynchronously according to previously determined information. A supplemental media stream that is output asynchronously to the main media stream suspends the main media stream and the timing of the main media stream while the supplemental media stream is output.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
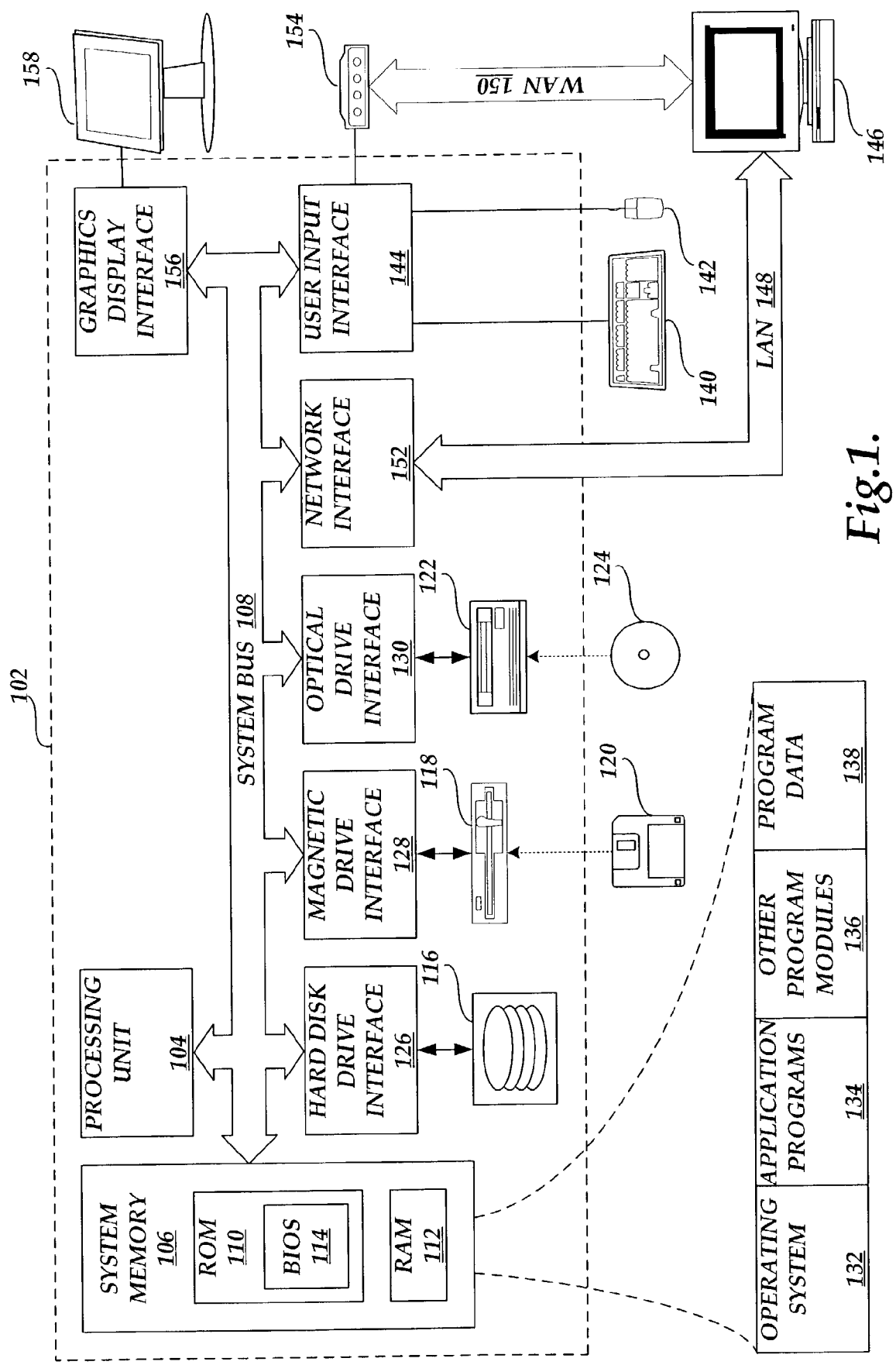
FIG. 1 is a block diagram of an exemplary computer system suitable for operating the present invention.

FIG. 1 and the following discussion are intended to provide a brief, general description of a computing system suitable for implementing various features of the invention. While the computing system will be described in the general context of a personal computer usable in a distributed computing environment, where complementary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices. Additionally, while the present invention is described in connection with a computer system, it should be understood that the invention may be used in connection with other media stream players such as VCR or DVD players with appropriate control system modifications.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read-only memory (ROM) 110 and random access memory (RAM) 112. A basic input/output system 114 (BIOS), containing the basic routines that help to transfer information between elements within the personal computer 102, such as during start-up, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. In addition, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
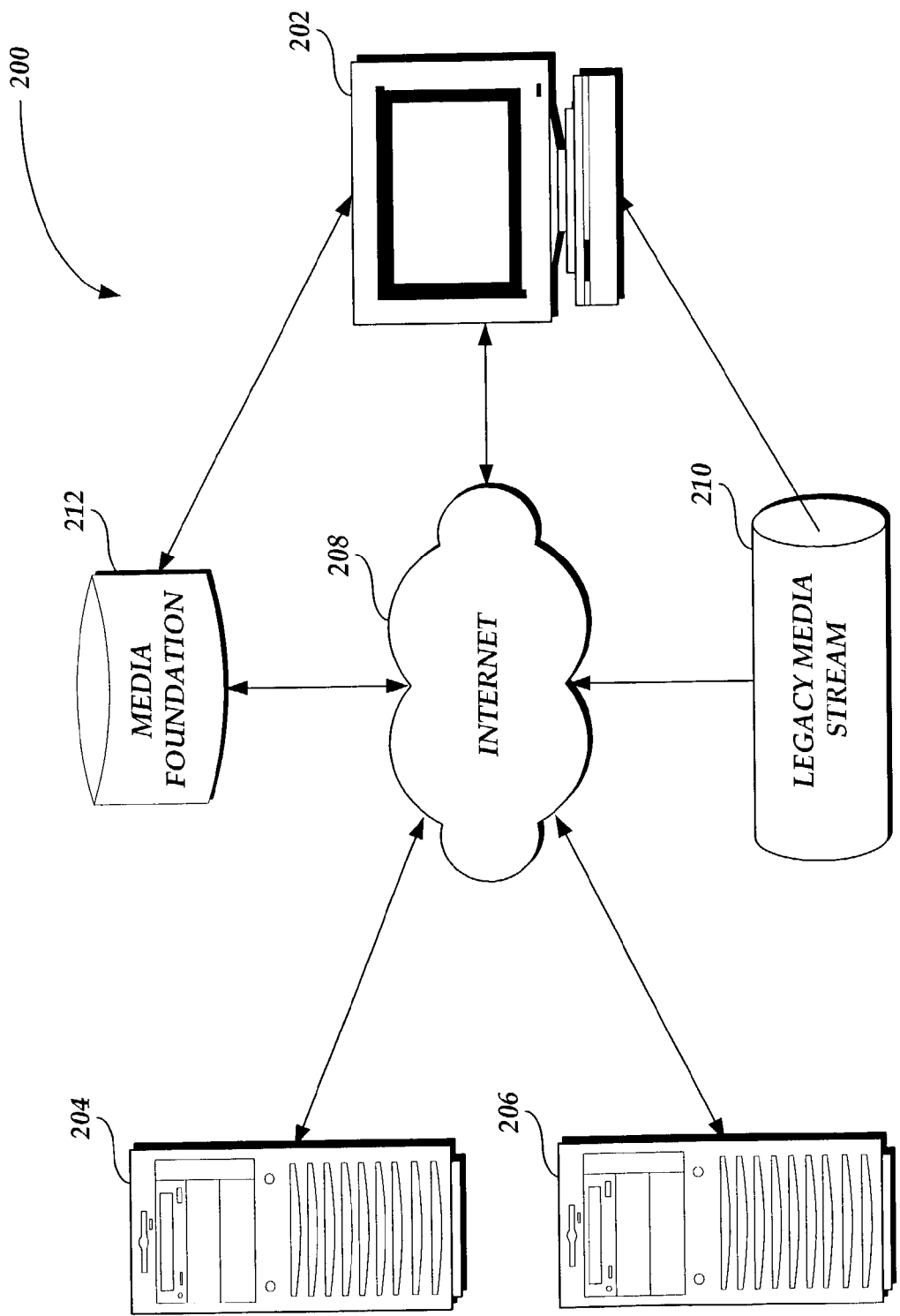
FIG. 2 is a block diagram of an exemplary networked computing environment suitable for implementing the present invention.

FIG. 2 is a block diagram of an exemplary networked computing environment 200 suitable for implementing the present invention. The exemplary network operating environment 200 includes a computing device 202 for outputting a main media stream and associated supplemental media streams to the user, such as the computing device described above in regard to FIG. 1. It should be understood that, while this exemplary network system 200 describes using a computing device 202 to display the media streams, it is for illustration purposes only, and should not be construed as limiting upon the present invention. Those skilled in the art will readily recognize that other devices, properly adapted according to the present invention, may also be used in place of the computing device 202, such as televisions or other devices capable of outputting media streams.

According to aspects of the present invention, the exemplary network environment 200 also includes a media foundation 212 connected to the computing device 202. The media foundation 212 is a data store for storing information, such as the main media stream data, supplemental media stream data, event information, and legacy media stream data. Other information related to displaying at least one supplemental media stream in conjunction with a main media stream may be stored in the media foundation 212 including user preferences, selections as to what types of media content may be displayed, and preferred output mechanisms.

As shown in the illustrative diagram, the media foundation 212 may be connected directly to the computing device 202 or, alternatively, may be indirectly connected to the computing device via the Internet 208, or some other communication network. In addition, while it may be beneficial to store the information described above in the media foundation 212, storing data in the media foundation is not essential to operating the present invention. Information, such as a main media stream, associated supplemental streams, and event information may be obtained from devices such as server 204 or server 206. These devices may be connected to the computing device 202 via the Internet 208, or some other communication network, and provide the information to the computing device for outputting a media stream in accordance with the present invention.

The exemplary network environment 200 may also include a legacy media stream source 210. A legacy media stream, as described in this application, generally refers to prior art media streams, including a main media stream with a supplemental media stream. Examples of legacy media streams include television broadcast signals, and television broadcast signals with NTSC Line 21 closed captioning. As shown in the exemplary network environment 200, the legacy media stream source 210 may be connected directly to the computing device 202 or, alternatively, may be connected to the computing device via the Internet 208. Additionally, but not shown, legacy media streams may be provided to the computing device 202 by external devices, such as server 204 or server 206.

Figure 3A:
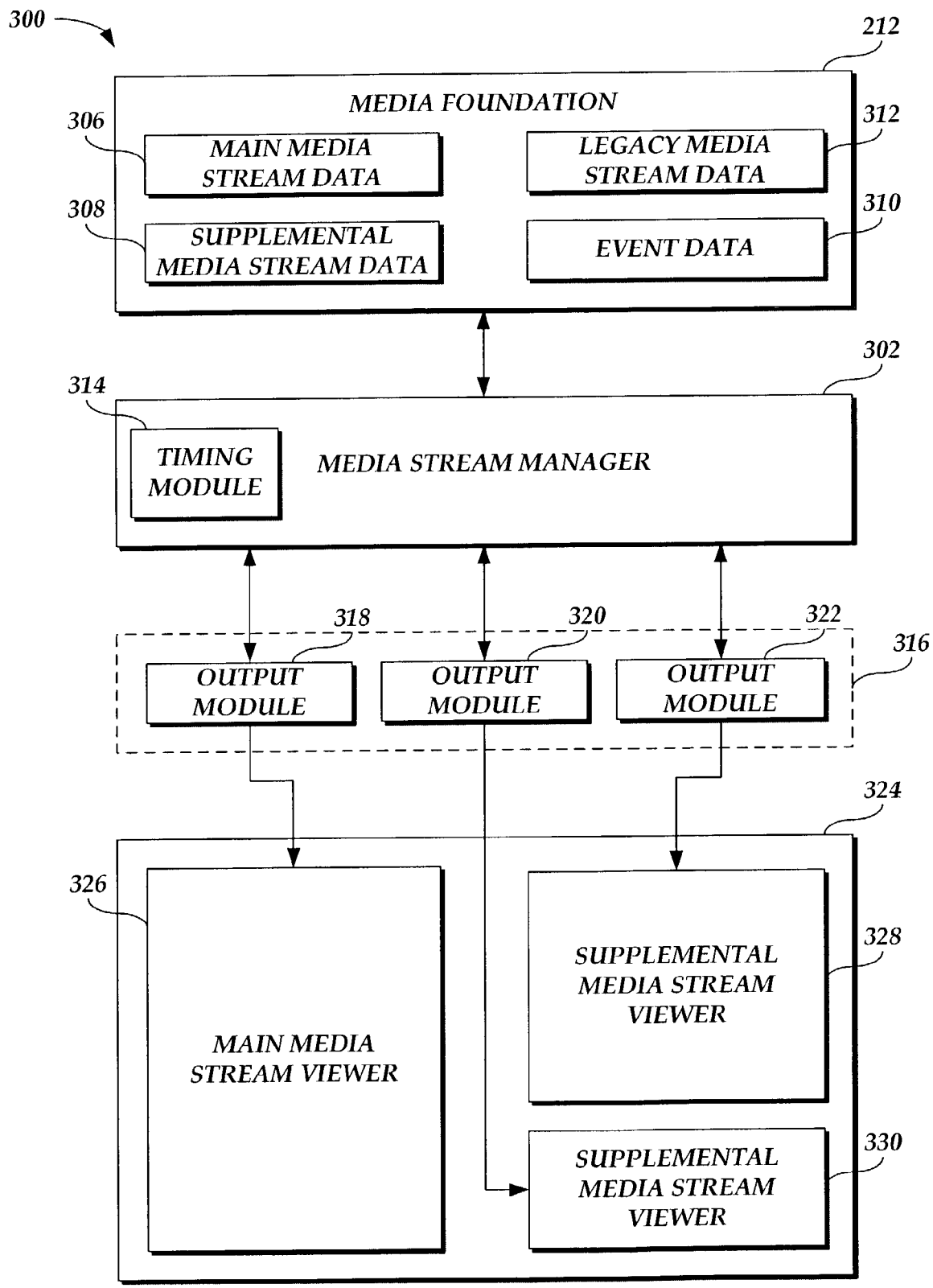
FIGS. 3A and 3B are block diagrams of exemplary media stream synchronization systems formed in accordance with the present invention.
Figure 3B:
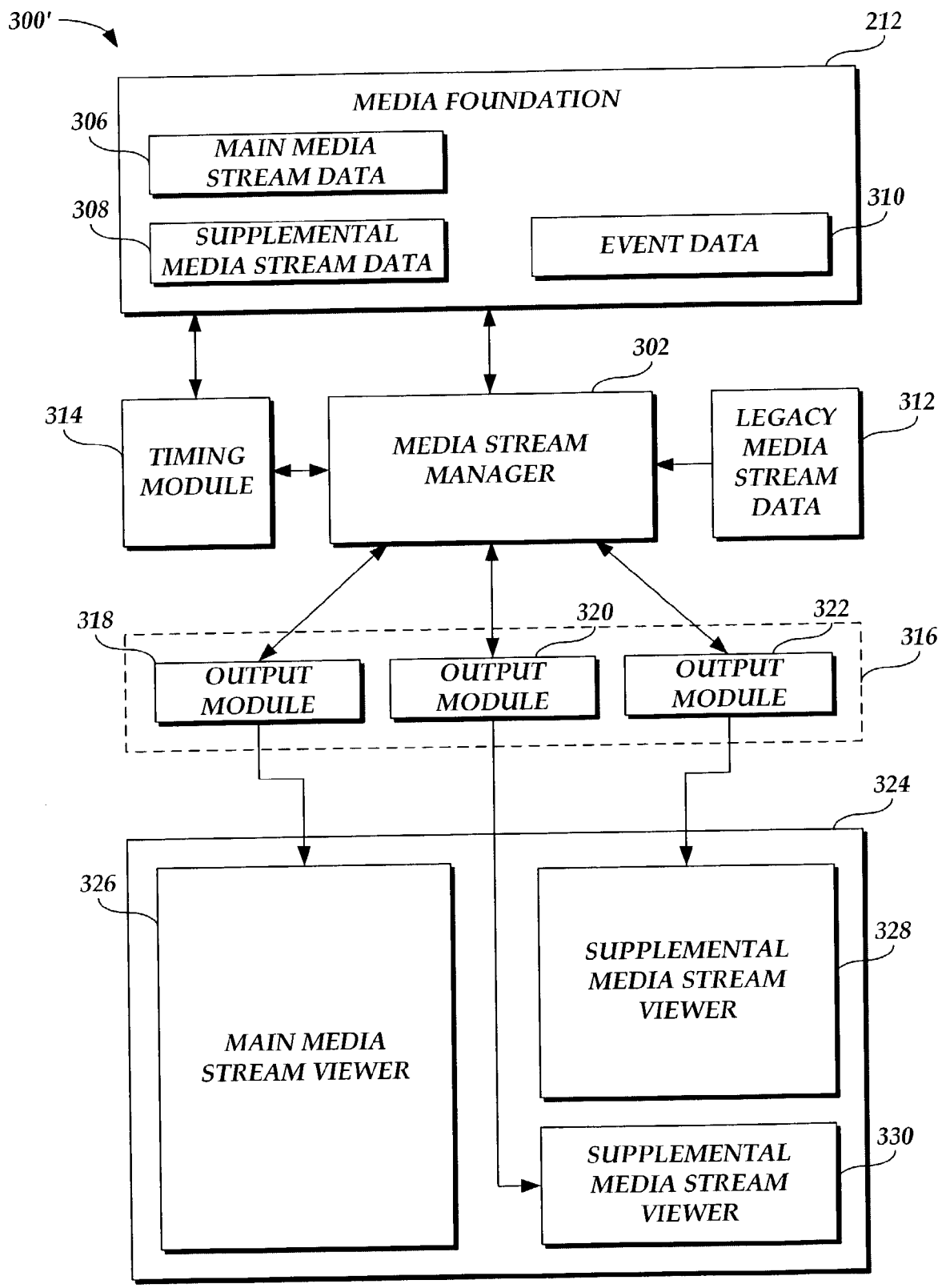

FIGS. 3A and 3B are block diagrams of exemplary media stream synchronization systems 300 and 300' formed in accordance with the present invention. The exemplary systems 300 and 300' include a media stream manager 302, a timing module 314, and a media stream output device 324. According to the present invention, the media stream manager 302 is responsible for directing the output of main media streams and associated supplemental media streams. The media stream manager 302 determines the location of the main media streams and supplemental media streams, and controls the synchronization of supplemental media streams by suspending and resuming output of the media streams.

In order to synchronize the output of supplemental media streams to a main media stream, the exemplary media stream synchronization systems 300 and 300' use the timing module 314 to track the output of a media stream according to the amount of time the stream has been displayed. As shown in the media stream synchronization system 300 (FIG. 3A), the media stream manager 302 includes a timing module 314. Alternatively, as shown in the media stream synchronization system 300' (FIG. 3B), the timing module 314 may be external to the media stream manager 302. The timing module 314 generates triggering events at predetermined times during the output of a media stream. The triggering events are detected by the media stream manager 302, whereupon the media stream manager acts to synchronize the media streams.

The illustrated media stream synchronization systems 300 and 300' include a media foundation 212, previously described in regard to FIG. 2. As shown, the media foundation 212 includes information such as main media stream data 306, supplemental media stream data 308, event data 310, and legacy media stream data 312. According to illustrated media stream synchronization systems 300 and 300', the media stream manager 302 communicates with the media foundation 212, and retrieves information stored therein. Alternatively, the media stream manager 302 may retrieve information from external sources, as described above in regard to FIG. 2.

The main media stream data 306 includes main media streams, and may include other information associated with the main media streams. Main media streams are not restricted to being video streams, but may also include audio streams. Accordingly, associated information in the main media stream data depends upon the type of main media stream, but may include information such as location of the main media stream on the media stream output device 324, size of the main media stream view 326 on the media stream output device, audio channel, and type of media stream viewer to employ for outputting the main media streams.

The supplemental media stream data 308 includes supplemental media streams for display in conjunction with the main media streams. Additionally, the supplemental media stream data 308 includes other information for outputting the supplemental media streams, similar to that of the main media stream data, such as output location on the media stream output device 324, size of the supplemental media stream view, audio channel, synchronous/asynchronous output information, and type of media stream view to employ for outputting the supplemental media streams. Outputting a supplemental media stream synchronously to the main media stream implies outputting the main media stream and supplemental media stream simultaneously, and outputting a supplemental media stream asynchronously to the main media stream implies suspending the output and timing of the main media stream while outputting the supplemental media stream.

The event data 310 includes event tables associating a main media stream with associated supplemental media streams and the predetermined times (in terms of output of the main media stream) that the timing module 314 is to issue triggering events to the media stream manager 302. As will be described below, in conjunction with the media stream manager 302 outputting a main media stream, the media stream manager initializes the timing module 314 with an event table from the event data 310, and causes the timing module to begin timing as the media stream manager begins outputting the main media stream.

Legacy media stream data 312 includes a legacy media stream and associated information for displaying the legacy media stream on the media stream output device 324, similar to the associated information with the main media stream data 306 and supplemental media stream data 308. Additionally, the legacy media stream may be stored as a legacy media stream, or may also be separated into a main legacy media stream and supplemental legacy media stream. As shown in the media stream synchronization system 300 (FIG. 3A), the legacy media stream data 312 may be stored in the media foundation 212. Alternatively, as shown in the media stream synchronization system 300' (FIG. 3B), legacy media stream data 312 may be external to the media foundation 212, such as when the legacy media stream is provided directly to the computing device 202 as described in regard to FIG. 2.

It should be understood that the information stored in the media foundation may be of a static or dynamic nature. A static nature refers to keeping the entirety of the data in the media foundation 212 for more time than simply during the output of the media streams. Alternatively, a dynamic nature refers to temporarily storing the data in the media foundation 212 as the media streams are output, akin to a buffering system. All of the data described above, the main media stream data 306, the supplemental media stream data 308, the event data 310, and the legacy media stream data 312 may be either statically stored in the media foundation 212, or dynamically stored.

The media stream manager 302 outputs the main, supplemental, and legacy media streams by instantiating output modules 316. The exemplary media stream synchronization systems 300 and 300' in FIGS. 3A and 3B illustrate having three output modules 318, 320, and 322, showing that a main media stream and two supplemental media streams associated with the main media stream are simultaneously being output. However, it should be understood that this is for illustration purposes, and should not be construed as limiting on the present invention. Those skilled in the art will recognize that any number of main media streams and associated supplemental media streams may be simultaneously output to a media stream output device 324.

The media stream manager 302 instantiates individual output modules, such as module 318, according to the type of media stream to be output. The type information may be determined as the media stream is to be output or, alternatively, may be previously determined as stored in the media foundation 212 with the media stream to be output. The media stream manager 302 will typically also provide the output modules 316 with the other data associated with the media stream to be output, such as location and type of the media stream viewer or audio channel. Based on the information provided by the media stream manager 302, the output modules 316 create/open the appropriate output mechanisms, such as media stream viewers or audio channels. For instance, as illustrated in FIGS. 3A and 3B, output module 318, which is associated with a main media stream, creates a main media stream viewer 326 on the media stream output device 324. Similarly, output modules 320 and 322 create supplemental media stream viewers 328 and 330 on the media stream output device 324.

According to one embodiment of the present invention, visual media streams are output on one of three media stream viewers: a multimedia content viewer, a synchronized blocks content viewer, and a synchronized lines content viewer. These viewers are described in greater detail below in regard to FIGS. 10, 11A-B, and 12A-F. However, these viewers are for illustration purposes and should not be construed as limiting upon the present invention. Those skilled in the art will recognize that there are other media stream viewers/displayers that may be used with the present invention without departing from the scope of the present invention.

An example of displaying a main media stream and associated supplemental media stream is given here to illustrate how the identified components of a media stream synchronization system interact. After being directed to output a main media stream, the media stream manager 302 retrieves the main media stream and associated data from the media foundation 212. The media stream manager also retrieves an event table associated with the main media stream from the event data 310 in the media foundation 312. The media stream manager 302 initializes the timing module 314 (being either a part of the media stream manager or a separate, cooperating module) with the event table. The media stream manager 302 also determines the type of the main media stream, instantiates an appropriate output module, such as output module 318, and provides, or binds, the main media stream to the output module. The output module 318 creates a media stream viewer, such as main media stream viewer 326, on the media stream output device 324. The media stream manager then begins outputting the main media stream by signaling the output module 318 and the timing module to begin in concert.

After a certain amount of time, and according to the event table provided to the timing module 314, the timing module issues a triggering event. The media stream manager detects the triggering event and determines whether to output the associated supplemental media stream (or streams) either synchronously or asynchronously with the main media stream. This determination may be based on information stored in the supplemental media stream data 308, or determined according to the type of supplemental media stream. As indicated, there may be multiple media streams associated with a single triggering event. According to aspects of the present invention, multiple media streams may be organized according to a priority, such that those associated supplemental media streams with a higher priority are output before those with lower priorities. According to further aspects of the present invention, multiple associated supplemental media streams may be output simultaneously if they are to be output synchronously with the main media stream. According to yet further aspects of the present invention, when an associated supplemental media stream is output asynchronously, any currently outputting supplemental media streams are terminated and the main media stream is suspended.

According to still further aspects of the present invention, supplemental media streams may be video, audio, or compiled media streams. Video supplemental media streams typically include both visual and audio aspects. Audio supplemental media streams have only audio aspects. Compiled media streams are a combination of a main media stream (also referred to as a compiled main media stream) and associated supplement media streams (also referred to as compiled associated supplemental media streams). They are, in essence, a main media stream and supplemental media streams used as a supplement media stream to another main media stream. Typically, output of a compiled supplemental media stream implies that the compiled supplemental media stream be output asynchronously to the main media stream.

Both synchronous and asynchronous supplemental media streams may be associated with other supplemental media streams, referred to as conditional supplemental media streams. The output of the conditional supplemental media stream may be based on external conditions, such as whether certain user preferences are set. Thus, when a supplemental media stream is output, the timing module 314 is initialized with any event table associated with the supplemental media stream and tracks the timing of the associated supplemental media stream in order to issue the triggering events that cause the conditional supplemental media streams to be output. Conditional supplemental media streams are output synchronously with the supplemental media stream. Likewise, conditional triggering events are based on the timing of the supplemental media stream with which the conditional media stream is associated. The timing module 314 tracks the timing of the conditional supplemental media streams. Additionally, conditional supplemental media streams are typically output within the context of its associated supplemental media stream.

Returning again to the example, if a supplemental media stream is to be output asynchronously to the main media stream, the media stream manager 302 suspends the output of the main media stream and the timing of the main media stream at the timing module 314 and outputs the supplemental media stream. Thereafter, or if the associated supplemental media stream is to be output synchronously with the main media stream, the media stream manager instantiates an output module, such as output module 320, and binds the supplemental media stream to the output module. The output module creates a media viewer, such as supplemental media viewer 328, for outputting the supplemental media stream. The media stream manager 302 then initializes the timing module 314 to time the supplemental media stream, and simultaneously begins the output of the supplemental media stream and its timing. The media stream manager 302 outputs all supplemental media streams associated with the triggering event. If, at the end of outputting the associated supplemental media streams, the main media stream is suspended, the main media stream is resumed, as is the timing of the main media stream.

Figure 4:
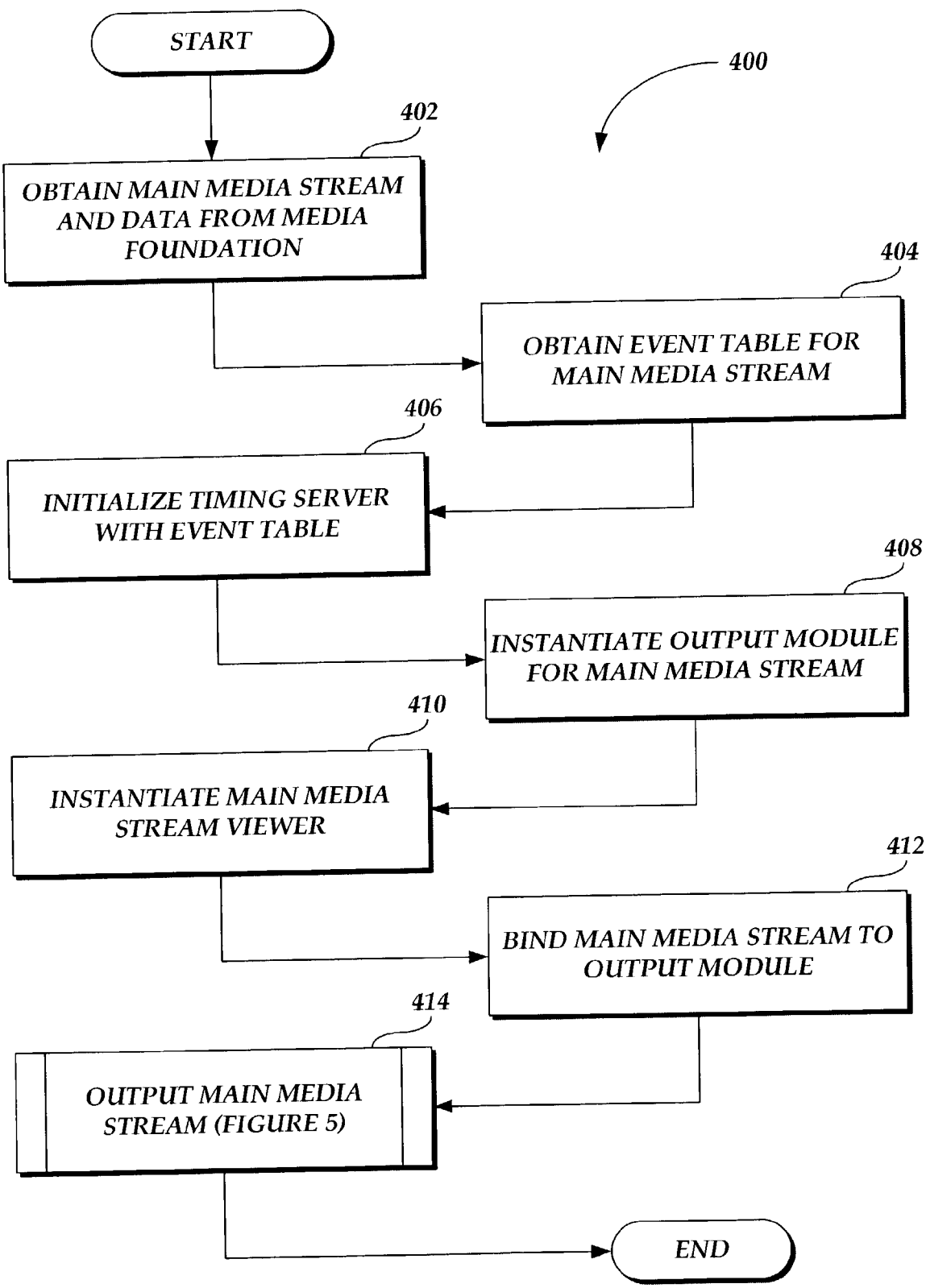
FIG. 4 is a flow diagram illustrative of an exemplary initialize main media stream output routine for initializing the output of a main media stream.

FIG. 4 is a flow diagram illustrative of an exemplary initialize main media stream output routine 400 for initializing the output of a main media stream. Beginning at block 402, the media stream manager 302 obtains main media stream and associated data 306 from the media foundation 212. At block 404, the media stream manager 302 obtains the event table associated with the main media stream from the event data 310. At block 406, the media stream manager 302 initializes the timing module 314 with the event table. At block 408, the media stream manager 302 instantiates an output module for the main media stream according to the type of main media stream. At block 410, the output module instantiates a main media stream viewer with the media stream output device 324. Alternatively (not shown), the output module instantiates an audio channel for outputting the main media stream if appropriate for the type of main media stream. At block 412, the media stream manager 302 binds the main media stream to the output module. At block 414, the main media stream is output. A description of outputting the main media stream is described in regard to FIG. 5 below. Thereafter the routine 400 terminates.

Figure 5:
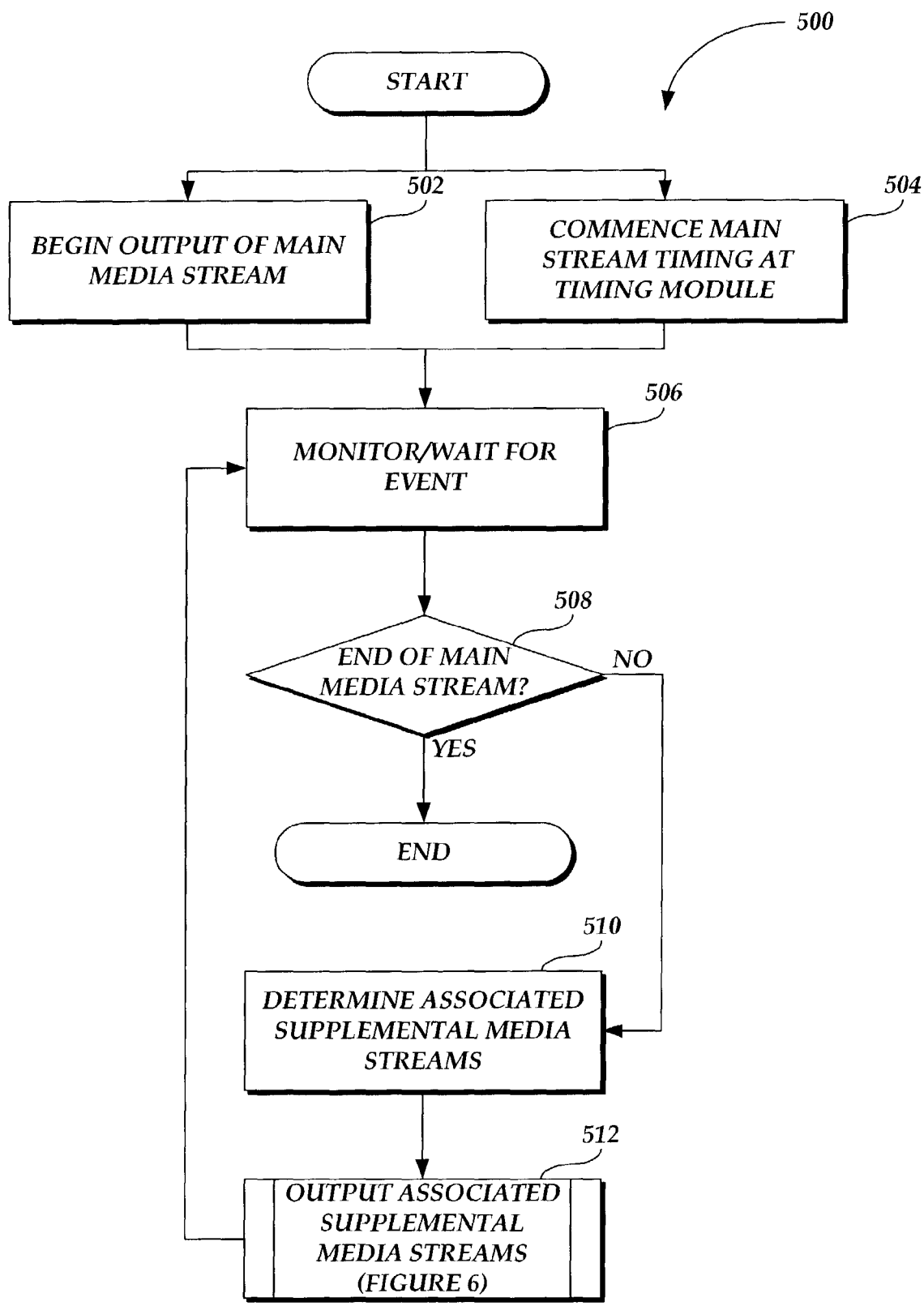
FIG. 5 is a flow diagram illustrative of an exemplary output main media stream subroutine for outputting the main media stream and supplemental media streams in accordance with the present invention.

FIG. 5 is a flow diagram illustrative of an exemplary output main media stream subroutine 500 for outputting the main media stream and supplemental media streams in accordance with the present invention. Beginning at block 502, the media stream manager 302 causes the output module to begin outputting the main media stream. Additionally, at block 504, the media stream manager 302 causes the timing module 314 to begin timing the output of the main media stream. According to aspects of the present invention, the steps identified in blocks 502 and 504 are carried out in parallel. Alternatively, these steps may be carried out sequentially. However, if the steps are carried out sequentially, it is important that the output of the main media stream coincide with the timing of the main media stream at the timing module 314.

At block 506, the media stream manager 302 monitors/waits for triggering events to be issued by the timing module 314. Upon detecting a triggering event, at decision block 508, a determination is made whether the detected triggering event is an end of main media stream event. If the triggering event is an end of main media stream event, the exemplary subroutine 500 terminates. Alternatively, if the event is not an end of main media stream event, at block 510, the media stream manager 302 determines which supplemental media streams are associated with the triggering event. After having determined which supplemental media streams are associated with the main media stream, at block 512, those associated supplemental media streams are output. A more detailed description of outputting associated supplemental media streams is described below in regard to FIG. 6. After having output the associated supplemental media streams, the exemplary routine 500 returns again to block 506 where it again monitors/waits for a triggering event to occur. This subroutine 500 continues until an end of main media stream event occurs, thereby causing the subroutine to terminate.

Figure 6A:
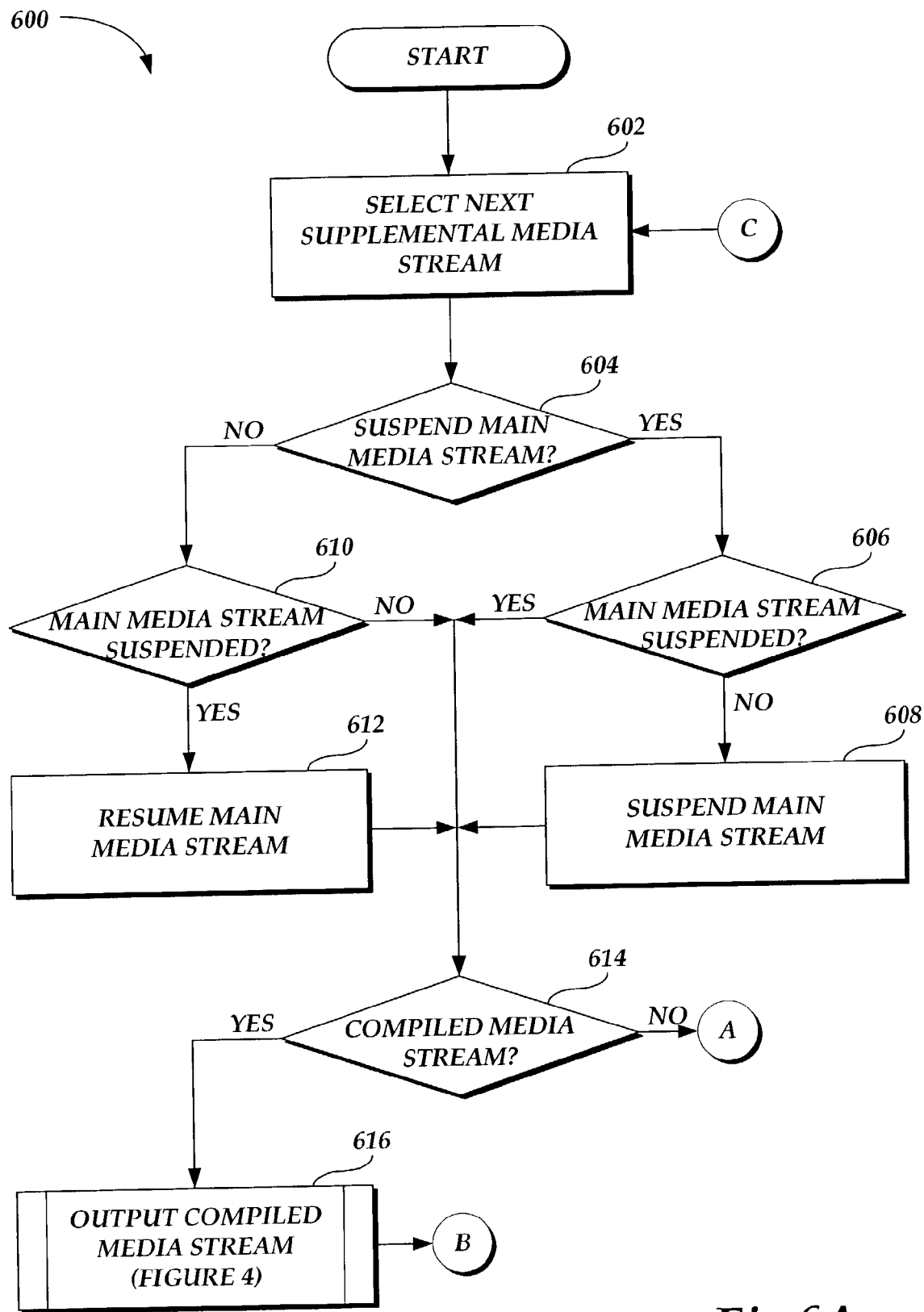
FIGS. 6A, 6B, and 6C are flow diagrams illustrative of an output associated supplemental media streams subroutine for use in the exemplary output main media stream shown in FIG. 5.
Figure 6B:
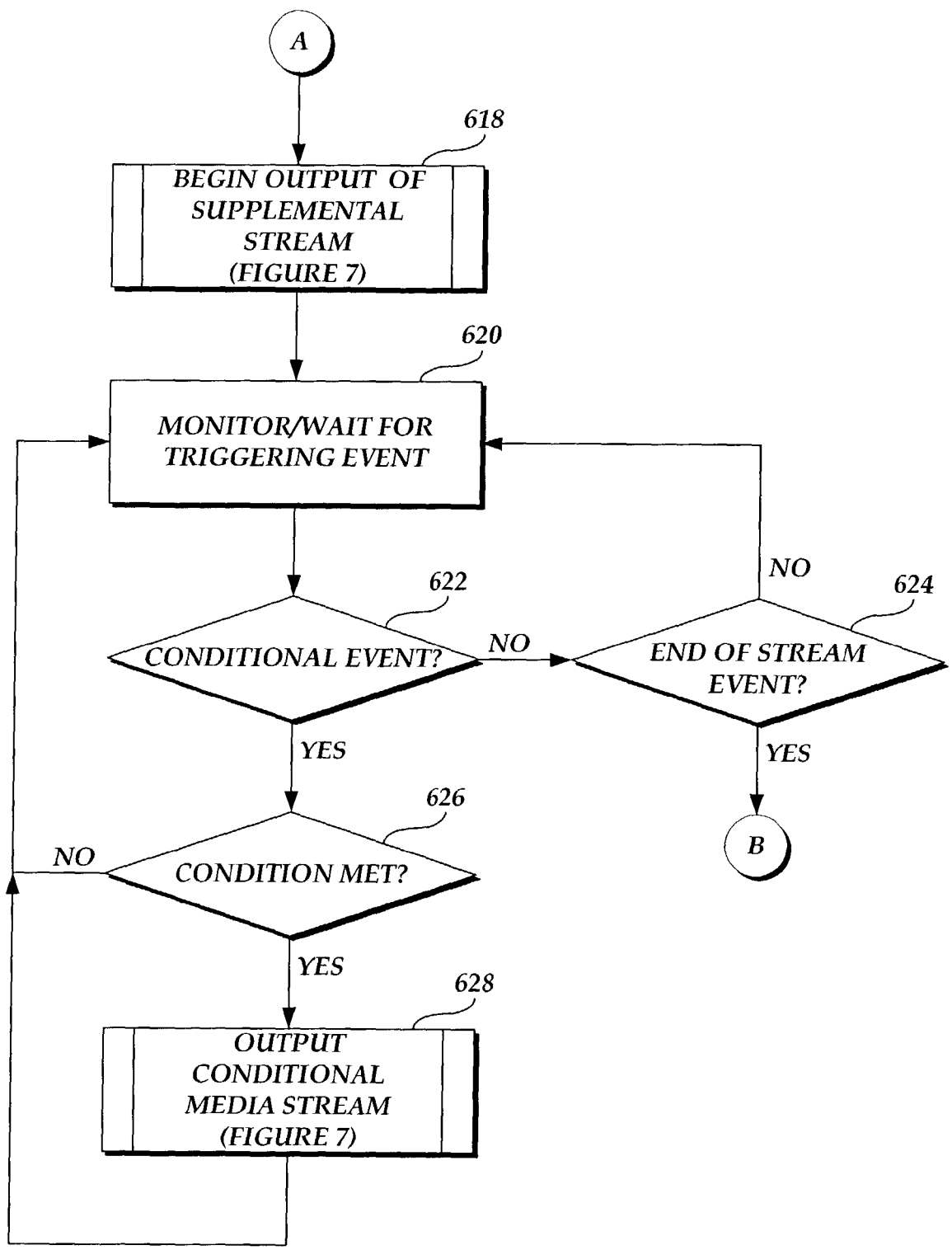
Figure 6C:
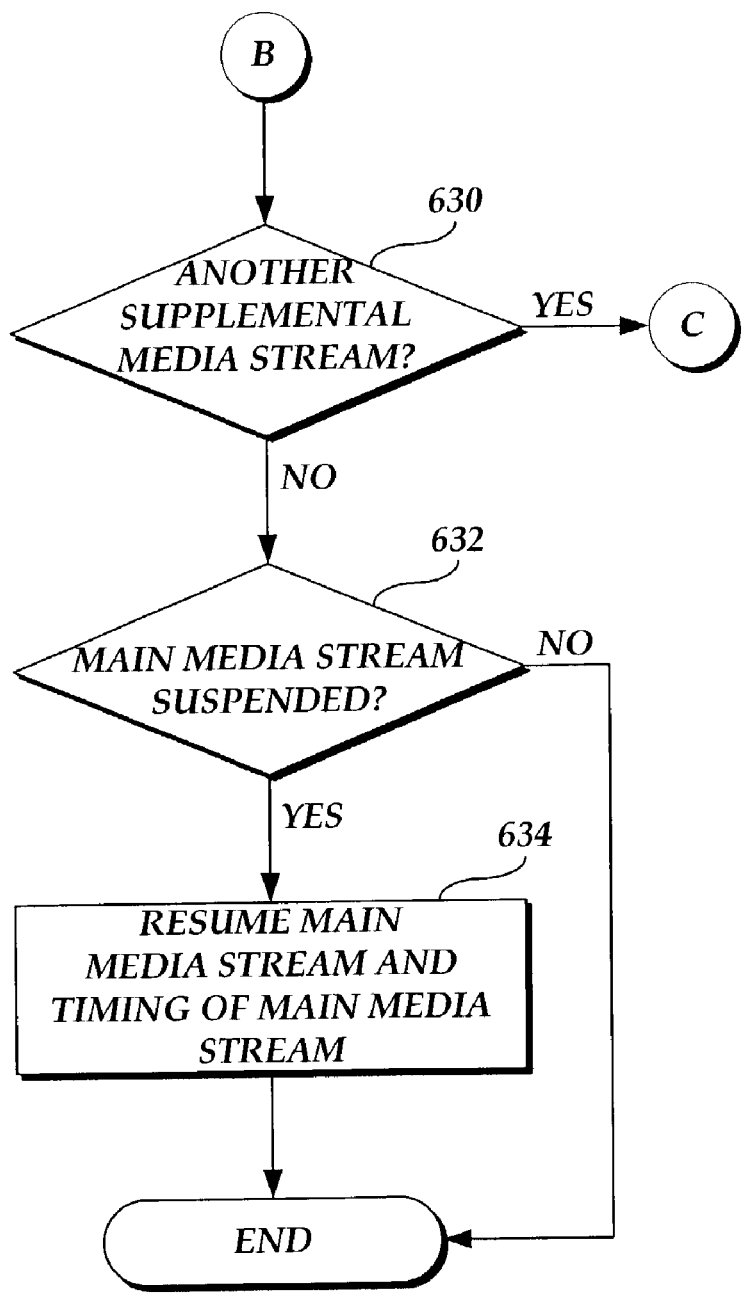

FIGS. 6A, 6B, and 6C are flow diagrams illustrative of an output associated supplemental media streams subroutine 600 for use in the exemplary output main media stream subroutine 500 described above in regard to FIG. 5. Beginning at block 602, the next supplemental media stream is selected for output. If this is the first time this block has been reached, the first supplemental media stream will be selected. At decision block 604, a determination is made as to whether to suspend the main media stream. As previously discussed, this determination is based on whether the selected associated supplemental media stream is to be output synchronously or asynchronously with the main media stream. If the main media stream is to be suspended, at decision block 606, a further determination is made as to whether the main media stream is already suspended. Typically, the main media stream will already be suspended if the previous associated supplemental media stream was output asynchronously. If, at decision block 606, the main media stream is not already suspended, at block 608, the main media stream is suspended, and the routine 600 proceeds to decision block 614. Alternatively, at decision block 606, if the main media stream is already suspended, the routine 600 proceeds directly to decision block 614.

Alternatively, at decision block 604, if the selected supplemental media stream is to be output synchronously with the main media stream, or in other words, the main media stream is not to be suspended, at decision block 610, a further determination is made as to whether the main media stream is currently suspended. If the main media stream is currently suspended, at block 612, the main media stream is resumed, and the routine 600 proceeds to decision block 614. Alternatively, at decision block 610, if the main media stream is not currently suspended, the routine proceeds directly to decision block 614.

At decision block 614, a determination is made as to whether the selected supplemental media stream is a compiled media stream. As previously described, a compiled media stream comprises both a compiled main media stream and associated supplemental media streams. If, at decision block 614, the selected supplemental media stream is a compiled media stream, at block 616, the compiled media stream is output. As previously discussed, outputting a compiled media stream involves outputting a compiled media stream's main media stream and associated supplemental media streams in the same manner as a main media stream (as described in FIG. 4.) According to aspects of the present invention, the main media stream and the associated supplemental media streams of the compiled media stream are constrained to be displayed within the supplemental media stream view previously determined for the compiled media stream when the output module for the compiled media stream was instantiated. After outputting the compiled media stream, the exemplary subroutine proceeds to decision block 630. However, if, at decision block 614, the selected supplemental media stream is not a compiled media stream, the exemplary subroutine 600 proceeds to block 618.

At block 618, the exemplary subroutine 600 begins the output of the selected supplemental media stream. Outputting a supplemental media stream is described in greater detail in regard to FIG. 7.

Figure 7:
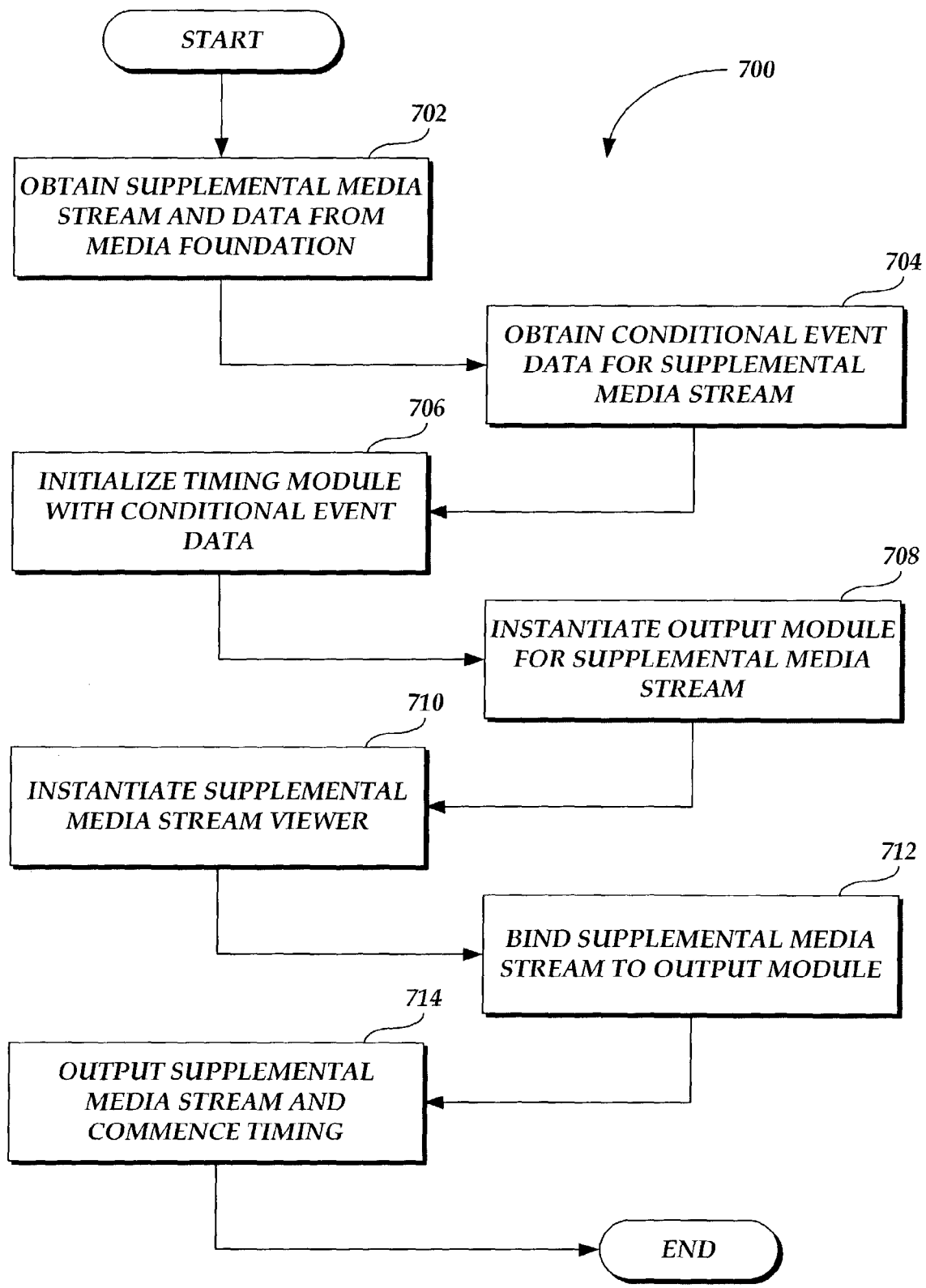
FIG. 7 is a flow diagram illustrative of an exemplary output supplemental media stream subroutine for use in the output associated supplemental media streams subroutine described in regard to FIGS. 6A, 6B, and 6C.

FIG. 7 is a flow diagram illustrative of an exemplary output supplemental media stream subroutine 700 for use in the output associated supplemental media streams subroutine 600 described in regard to FIGS. 6A, 6B, and 6C. Beginning at block 702, the supplemental media stream to be output, and any associated data, is obtained from the media foundation 212. After obtaining the supplemental media stream and associated data, at block 704, any conditional triggering event data for this supplemental media stream is obtained from the event data 310 in the media foundation 212.

At block 706, the timing module 314 is initialized with the conditional triggering event data retrieved from the media foundation 212. At block 708, an output module appropriate for outputting the supplemental media stream is instantiated. At block 710, a supplemental media stream viewer is instantiated. Alternatively (not shown), if the supplemental media stream is an audio supplemental media stream, an audio channel is instantiated for outputting the supplemental media stream. At block 712, the supplemental media stream is bound to the output module for display on the media stream output device 324. At block 714, the output of the supplemental media stream view commences along with the timing by the timing module 314. Thereafter, the subroutine 700 terminates.

Referring again to FIG. 6, at block 618, after beginning output of the supplemental media stream, the routine 600 proceeds to block 620, where it monitors/waits for a triggering event to occur. Upon detecting a triggering event, at decision block 622, a determination is made as to whether the triggering event is a conditional triggering event. If the triggering event is not a conditional triggering event, at decision block 624, a determination is made as to whether the triggering event was an end of stream event. If, at decision block 624, the triggering event is not an end of stream event, the event is ignored (for purposes of this routine), and control is returned again to block 620 where the routine monitors/waits for a subsequent triggering event. Alternatively, at decision block 624, if the triggering event is an end of stream event, the routine proceeds to decision block 630.

If, at decision block 622, the event is a conditional triggering event, at decision block 626, a determination is made as to whether the condition upon which the conditional event has issued has been met. According to one aspect of the invention, the condition may be met simply by issuing the triggering event. Alternatively, the condition may be based upon external conditions set in the media stream output device. For example, if the user has expressly disabled audio output, a conditional event based on the ability to output audio supplemental media streams would not be met, while a visual supplemental media stream would meet the condition for the conditional triggering event. If, at decision block 626, the condition is not met, the subroutine 600 returns again to block 620 where it again monitors/waits for subsequent triggering events. Alternatively, at decision block 626, if the condition is met, at block 628, the conditional media stream is output, as already described in regard to FIG. 7 for outputting a supplemental media stream. Thereafter, the exemplary routine returns again to block 620 to monitor/wait for additional triggering events.

At decision block 630, a determination is made as to whether another supplemental media stream is to be output. If there is another supplemental media stream to be output, the exemplary subroutine 600 returns again to block 602 where the next supplemental media stream is selected for output. Alternatively, at decision block 630, if there are no additional supplemental media streams to be output, at decision block 632, a determination is made as to whether the main media stream is currently suspended. If the main media stream is suspended, at block 634, the main media stream is resumed, as well as the timing of the main media stream at the timing module 314. Thereafter, the subroutine 600 terminates. Alternatively, if, at decision block 632, the main media stream is not currently suspended, the subroutine 600 immediately terminates.

Figure 8:
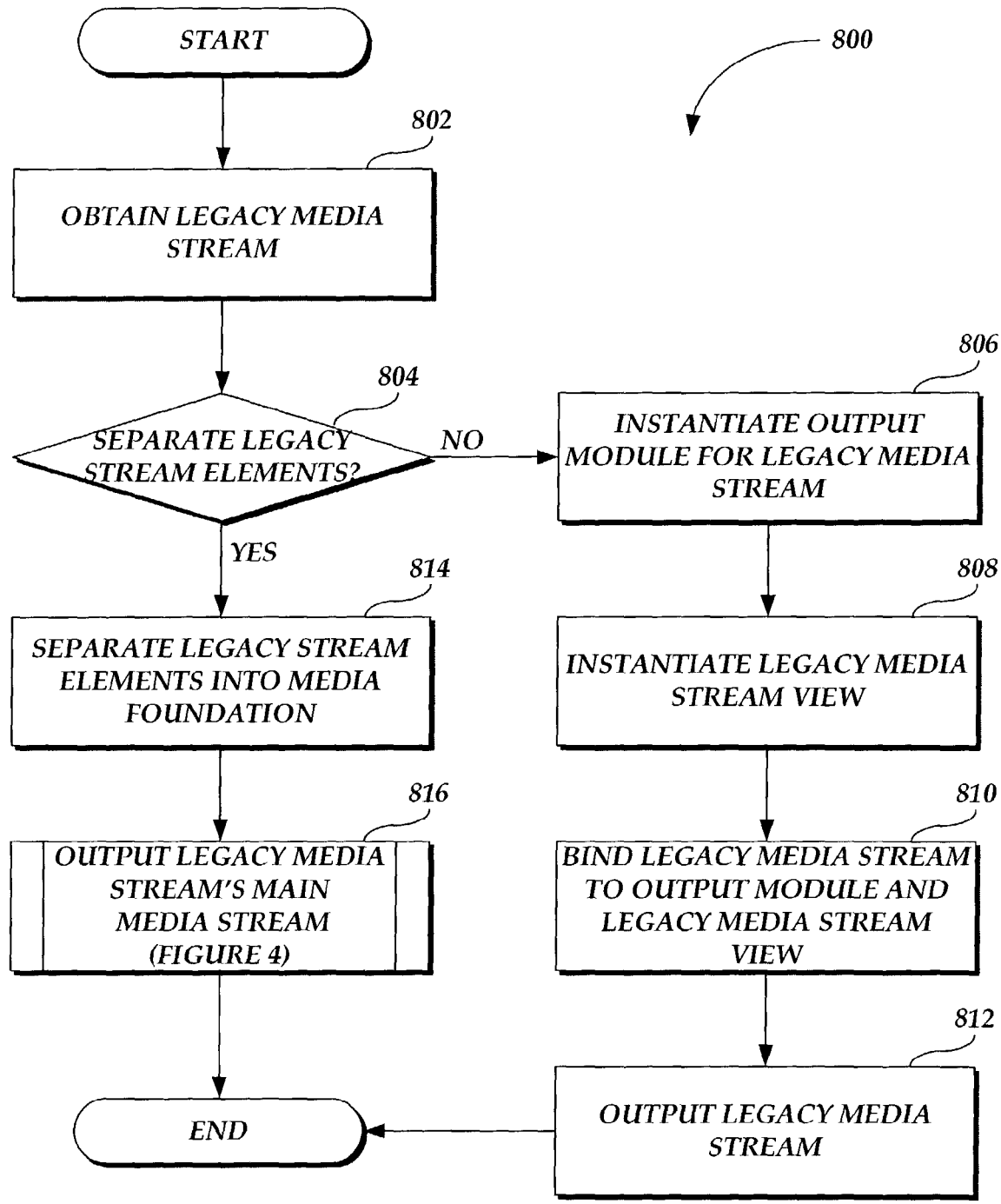
FIG. 8 is a flow diagram illustrative of an exemplary output legacy media stream for outputting a legacy media stream in accordance with the present invention.

FIG. 8 is a flow diagram illustrative of an exemplary output legacy media stream routine 800 for outputting a legacy media stream in accordance with the present invention. Beginning at block 802, a legacy media stream to be output is obtained. As previously described, the legacy media stream may be stored in the media foundation 212, or may be obtained as a direct video feed from another source. Still further, the legacy media stream information may be obtained from a network server or other media stream generating sources. After obtaining the legacy media stream, at decision block 804, a determination is made whether to separate the legacy media stream elements. Separating the legacy media stream elements comprises identifying and separating a main media stream and associated supplemental media streams from the legacy media stream. Additionally, the location of the associated supplemental media streams would provide information for generating triggering event information for the main media stream split from the legacy media stream.

If, at decision block 804, the legacy media stream is not to be split into separate elements, at block 806, the exemplary routine instantiates a media displayer for the legacy media stream. At block 808, an appropriate output module is instantiated for outputting the legacy media stream. At block 808, the legacy media stream viewer is created, as appropriate for the type of legacy media stream. At block 810, the legacy media stream is bound to the output module. At block 812, the legacy media stream is output to the media stream output device 324. Thereafter, the exemplary routine 800 terminates.

If, at decision block 804, the determination is made to separate the legacy media stream elements, at block 814, the legacy media stream elements are separated and stored in the media foundation 212. Because the legacy media stream elements have been separated into a main media stream and associated supplemental media streams, at block 816, the legacy media stream's main media stream is output as described above in regard to FIG. 4. Thereafter, the exemplary routine 800 terminates.

Figure 9:
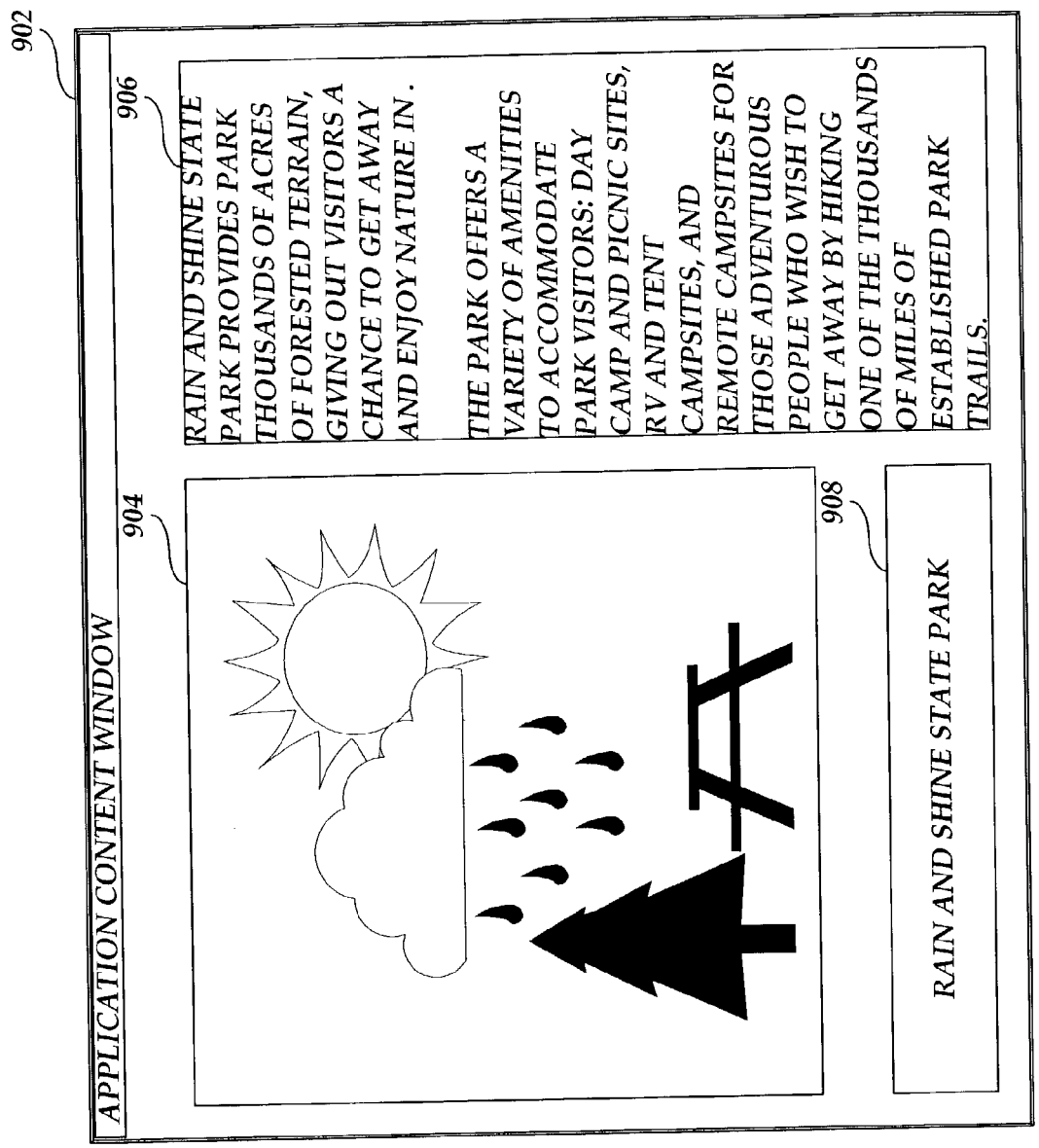
FIG. 9 is a block diagram illustrative of an exemplary content window on a media stream output device for outputting a main media stream and associated supplemental media streams in accordance with the present invention.

FIG. 9 is a block diagram illustrative of an exemplary content window 902 on a media stream output device 324 for outputting a main media stream and associated supplemental media streams in accordance with the present invention. As displayed on the media stream output device 324, an exemplary application for displaying visual aspects of both main media stream and supplemental media streams includes an application content window 902. According to aspects of the present invention, visual aspects of the main media stream, supplemental media streams, legacy media streams, and compiled media streams are displayed within the bounds of an application content window. However, constraining the media stream views to the application content window, as shown in FIG. 9, is illustrative and should not be construed as limiting upon the present invention. Those skilled in the art will recognize that other display systems may use multiple views that are not constrained with any particular content window.

The application content window includes a main media stream viewer 904. As previously discussed, the main media stream viewer 904 is selected according to the type of main media stream. For example, if the main media stream is a multimedia stream, the main media stream viewer 904 would be a view selected for its ability to display a video stream. The location and size of the main media stream viewer 904 may be determined according to the main media stream itself, or alternatively, may be based on information stored with the main media stream in the media foundation 212. Still further, the main media stream viewer 904 may be located according to default values in the application that directs the media stream manager 302 to output the main media stream.

Also shown in the exemplary application content window 902 are two supplemental media viewers, viewer 906 and viewer 908. As with the main media stream, the supplemental media stream viewers are selected according to the type of information presented by the associated supplemental media streams. For example, supplemental media stream viewer 906 may be a synchronized lines viewer, described below in greater detail in regard to FIGS. 12A-12F. Supplemental media stream viewer 908 may be a synchronized blocks viewer, described below in regard to FIGS. 11A-11B, appropriate for displaying HTML or XML mark-up language files. It should be understood that the supplemental media stream viewers 906 and 908 might not always be present on the application content window 902. As previously discussed, supplemental media stream viewers may be created as necessary to accommodate the display of supplemental media streams associated with the output of a main media stream. Similarly, as the supplemental media stream viewers have completed displaying a supplemental stream view, they may be destroyed/removed from the application content window 902.

Figure 10:
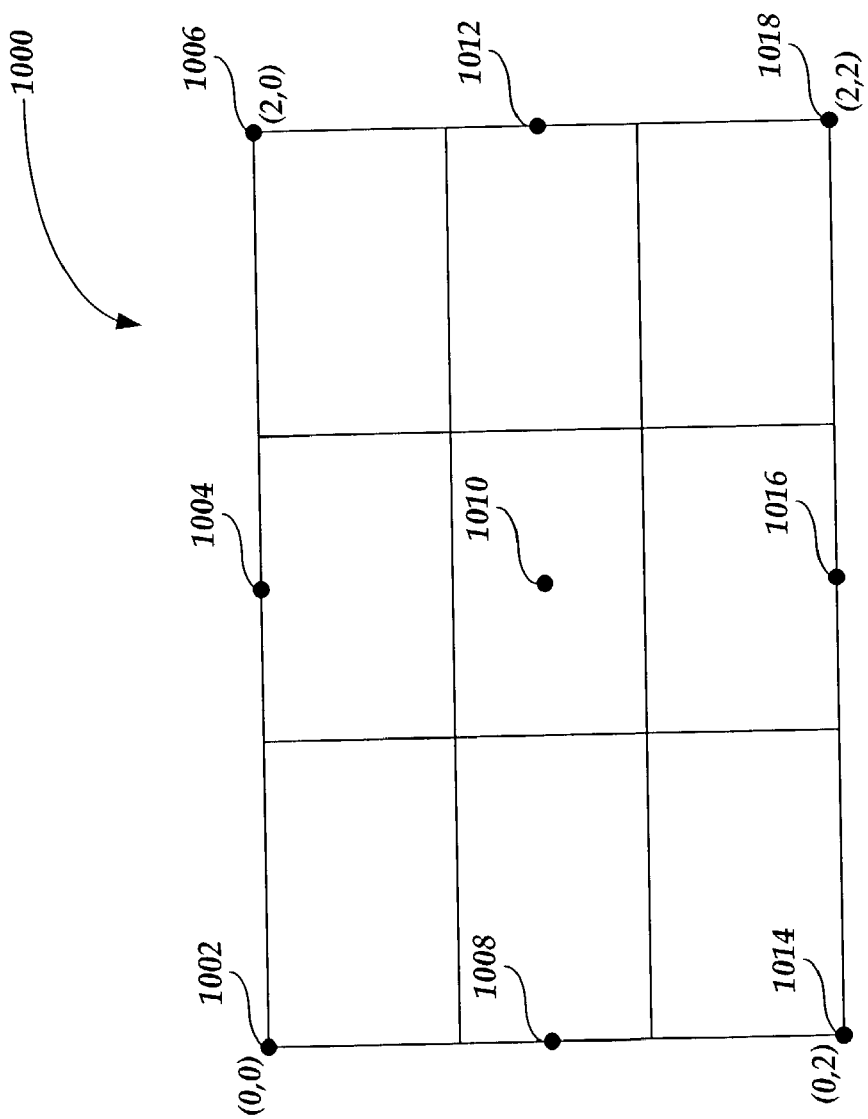
FIG. 10 is a block diagram illustrative of an exemplary multimedia content viewer for outputting supplemental media streams in accordance with the present invention.

FIG. 10 is a block diagram illustrative of an exemplary multimedia content viewer 1000 for outputting media streams in accordance with the present invention. As a general purpose media stream displayer, the multimedia content viewer 1000 is typically the most flexible of the content viewers presently utilized by the present invention. For convenience and accommodating multiple types of dynamic and fixed media streams, the multimedia content viewer 1000 has nine anchor locations, 1002-1018, located around the perimeter of the content viewer and in the center of the content viewer. In addition, the exemplary general purpose content view is divided into nine quadrants that are addressable from the upper left origin to the bottom right, the upper left origin being (0, 0), and the bottom right corner being (2, 2). Using the combination of anchor points and quadrant addressing, most media streams will be able to be displayed with a general purpose content view. The addressing and location information will typically be stored with the media stream in the media foundation 212. Examples of media streams that may be displayed in the multimedia content viewer 1000 include multimedia/video streams, graphic animation streams, marked up caption text, secondary video, graphic images, plain text, and legacy streams.

Figure 11A:
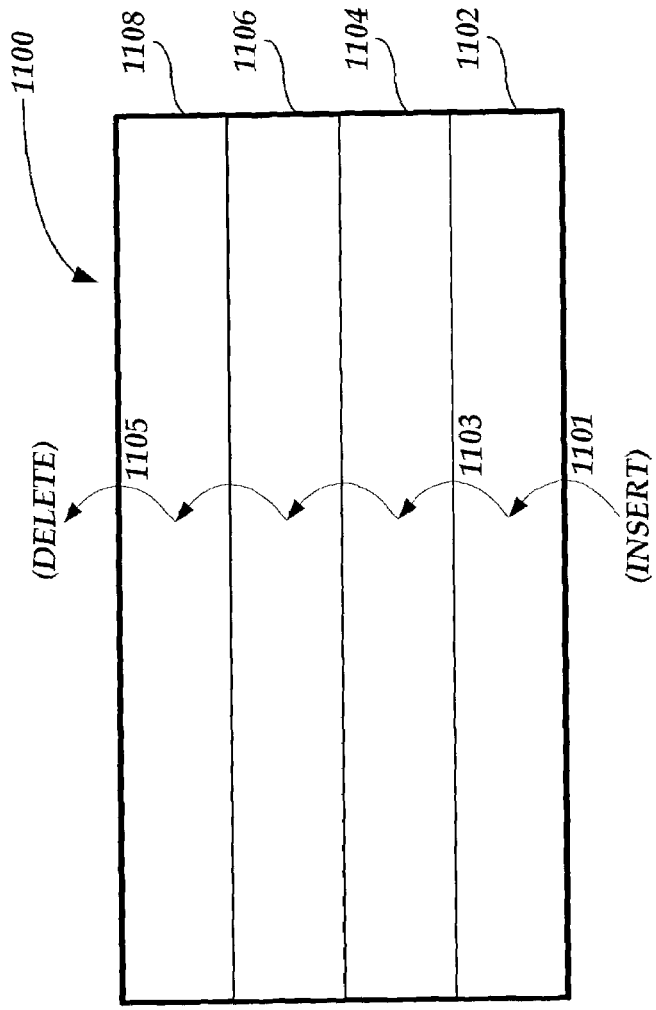
FIG. 11A is a block diagram illustrative of an exemplary synchronized blocks content viewer for outputting supplemental media streams as discrete blocks in accordance with the present invention.
Figure 11B:
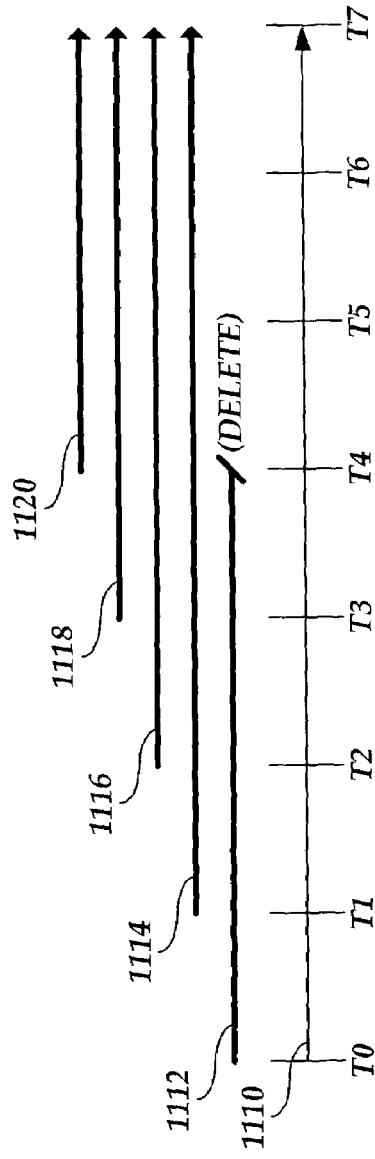
FIG. 11B is a block diagram illustrative of a timing diagram displaying a media stream in the synchronized blocks content viewer of FIG. 11A.

FIG. 11A is a block diagram illustrative of an exemplary synchronized blocks content viewer for outputting supplemental media streams as discrete blocks in accordance with the present invention, and FIG. 11B is a block diagram illustrative of a timing diagram displaying a media stream in the synchronized blocks content viewer of FIG. 11A. Synchronized block content viewers are used for displaying synchronized data in discrete fixed-size blocks. The exemplary synchronized block content viewer 1100 illustrated in FIG. 11A is divided into four block segments, 1102, 1104, 1106, and 1108. To display information in a synchronized content viewer, a block of the size for the viewer would be filled with content and inserted into the first segment 1102 of the content viewer 1100, as indicated by arrow 1101. A second block to be inserted into the content viewer 1100 would be filled and inserted into the viewer at segment 1102, causing the block previously in segment 1102 to scroll to segment 1104, as indicated by arrow 1103. In this manner, as a new block is inserted into the synchronized blocks content viewer 1100, those blocks currently displayed within the content viewer are scrolled by one segment. Once a block is at the topmost segment of the synchronized blocks content viewer 1100, such as segment 1108, that block would be scrolled out of the synchronized blocks content viewer 1100 and deleted, as indicated by arrow 1105.

Referring to FIG. 11B, an example of displaying content in the exemplary synchronized blocks content viewer 1100 is presented. Timing diagram 1110 illustrates the timing of media streams 1112, 1114, 1116, 1118, and 1120 as they scroll through the exemplary synchronized blocks content view 1100. Beginning at time T0 on the timing diagram 1110, the media stream 1112 is displayed on the exemplary synchronized blocks content viewer 1100 in segment 1102. At time T1, media stream 1114 is placed in a block and inserted into the exemplary synchronized blocks content viewer 1100 at segment 1102, causing media stream 1112 to scroll to segment 1104. At time T2, media stream 1116 is inserted into segment 1102 causing media streams 1112 and 1114 to scroll up yet again. At time T3, media stream 1118 is also inserted into the exemplary synchronized blocks content viewer 1100. Thus, at time T3, all segments, 1102-1108, of the synchronized blocks content viewer 1100 are occupied. At time T4, media stream 1120 is inserted into the synchronized blocks content viewer 1100. Because media stream 1112 was occupying segment 1108, media stream 1112 is scrolled off/out of the synchronized block content viewer 1100 and deleted. According to the timing diagram 1110, because there are no more remaining activities and, in particular, no additional media streams to insert into the content viewer 1100, no other scrolling takes place and all of the currently displayed media streams remain on the synchronized blocks content viewer 1100 until such time as the content viewer is destroyed.

Examples of content that may exist in a synchronized blocks content view include real-time captioning, plain scripting text, TV stream conversions, graphic images, and hyperlink/script content. As previously mentioned, media stream viewer 908 (FIG. 9) may be a synchronized blocks content viewer, possibly with only one display segment. Additionally, while the illustrated diagram and description describe inserting blocks on the bottom segment and scrolling up, the present invention is not so limited. Synchronized blocks content viewers may be defined to insert blocks on the top and scroll down or, alternatively, may be defined to insert blocks on the left or right of the content viewer and scroll the blocks horizontally across the content viewer.

Figure 12A:
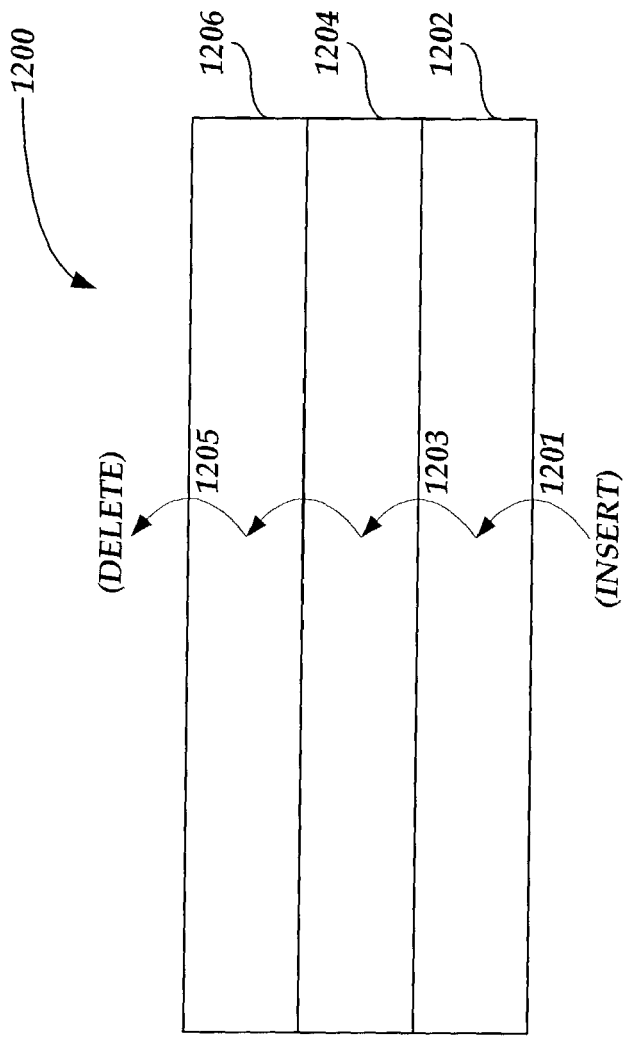
FIG. 12A is a block diagram illustrative of a synchronized lines content viewer for outputting supplemental media streams as synchronized lines in accordance with the present invention.
Figure 12B:
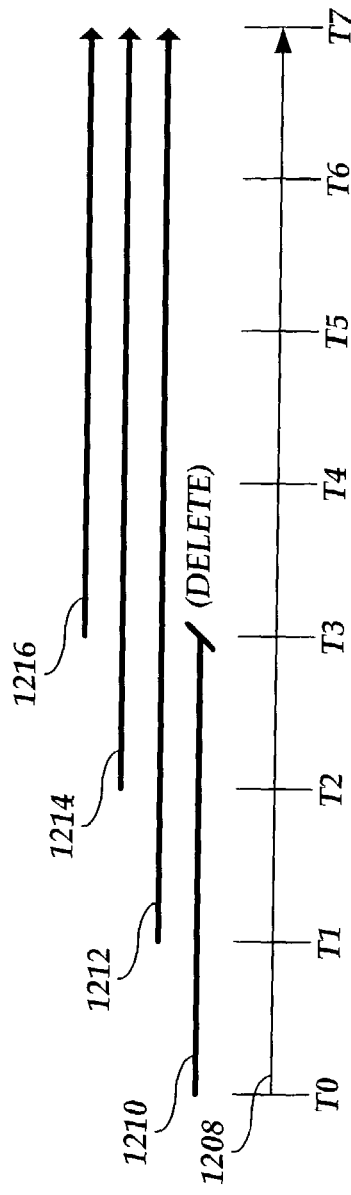
FIG. 12B is a block diagram illustrative of a timing diagram displaying a media stream in the synchronized lines content viewer of FIG. 12A, and FIGS. 12C-12F are block diagrams illustrative of the synchronized lines content viewer of FIG. 12A displaying content from a supplemental media stream in the synchronized lines content viewer.

FIG. 12A is a block diagram illustrative of a synchronized lines content viewer for outputting supplemental media streams as synchronized lines in accordance with the present invention; FIG. 12B is a block diagram illustrative of a timing diagram displaying a media stream in the synchronized lines content viewer of FIG. 12A; and FIGS. 12C-12F are block diagrams illustrative of the synchronized lines content viewer of FIG. 12A displaying content from a supplemental media stream in the synchronized lines content viewer.

As shown in FIG. 12A, an exemplary synchronized lines content viewer 1200 is comprised of three lines for content, lines 1202, 1204, and 1206. A synchronized lines content view is used when synchronized data is comprised mainly of a series/stream of text characters to be displayed on a screen. One significant difference between synchronized lines content viewers and synchronized block content viewers is that the content is not restricted to a single block as in synchronized blocks content viewers. Accordingly, the length of the text is not restricted by synchronized lines content viewers, though the entirety of the text may not be completely visible if it is sufficiently large as to overflow the content viewer. Synchronized lines content viewers are suitable for certain types of legacy media streams, including captioning streams such as the NTSC closed captioning (Line 21).

The size of the synchronized line content viewer 1200 is defined as a maximum width. The line height for each line is dependent upon the font size selected for displaying the text. Similar to the synchronized blocks content viewer, content to be inserted into a synchronized lines content viewer is inserted on the bottom line, such as line 1202, of the synchronized lines content viewer 1200. As text entering line 1202 will extend beyond the defined maximum width of the synchronized lines content viewer 1200, the data currently displayed in the content viewer is scrolled up by one line. Thus, as shown in the exemplary synchronized line content viewer 1200, the first stream of text is inserted in line 1202, as indicated by arrow 1201. As subsequent text is inserted at line 1202, the text occupying the line at 1202 is scrolled up to line 1204, as indicated by arrow 1203. Any text that occupies line 1206 when a new stream of text is inserted at line 1202 will be scrolled off the synchronized lines content viewer 1200, as indicated by arrow 1205, and deleted.

Figure 12D:
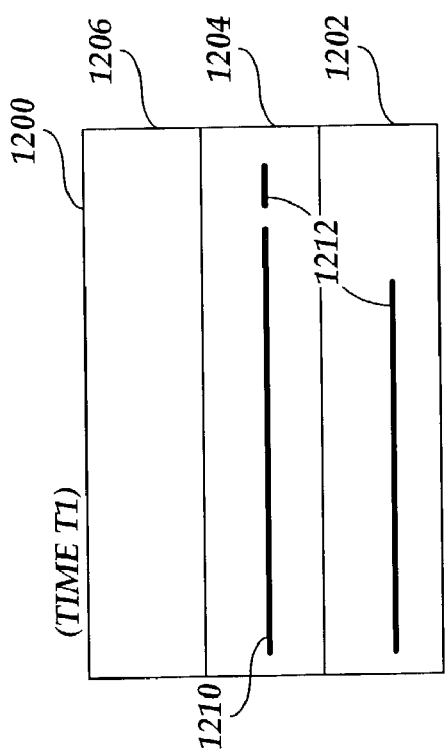
Figure 12F:
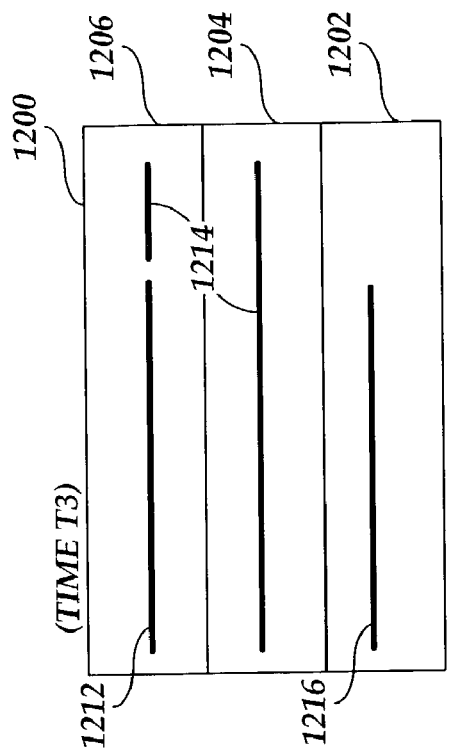
Figure 12C:
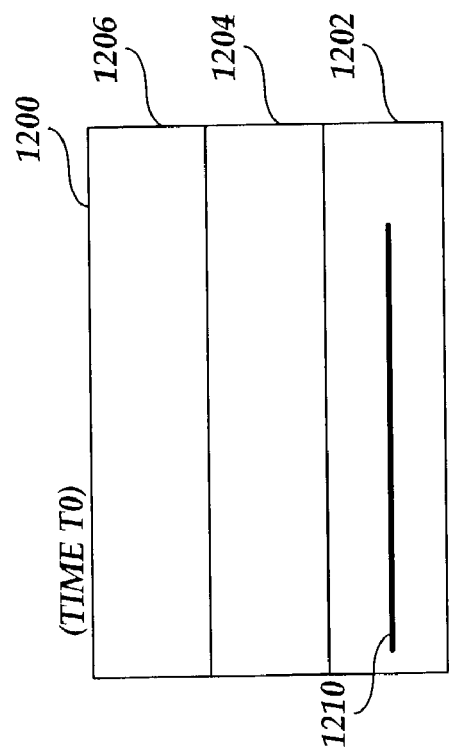
Figure 12E:
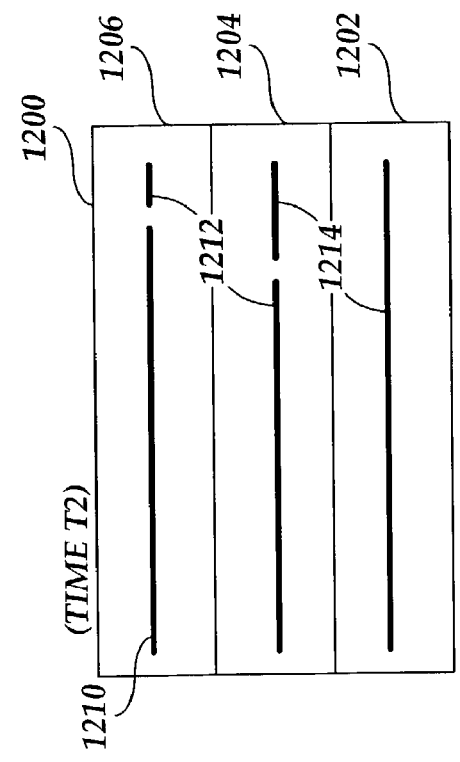

Referring to FIG. 12B, an example of displaying content in the exemplary synchronized lines content viewer 1200 is presented. Timing diagram 1208 illustrates the timing of media streams 1210, 1212, 1214, and 1216 as they scroll through the exemplary synchronized lines content viewer 1200. FIGS. 12C-12F illustrate the states of the exemplary synchronized lines content viewer 1200 with regard to the timing diagram 1208. Beginning at time T0, media stream 1210 is inserted into the exemplary synchronized lines content viewer 1200 at line 1202, as indicated by FIG. 12C. At time T1, media stream 1212 is inserted immediately after media stream 1210. Because media stream 1212 requires greater space than is available on the line with media stream 1210, the text is scrolled up one line to line 1204 and the remaining characters of media stream 1212 are inserted on line 1202, as indicated by FIG. 12D. At time T2, media stream 1214 is inserted after media stream 1212. Media stream 1214 being sufficiently long to not completely fit on the line with media stream 1212, the text in the exemplary synchronized lines content viewer 1200 is scrolled up and the remaining text of media stream 1214 is inserted on line the end of line 1202, as indicated by FIG. 12E. At time T3, media stream 1216 inserted. Because there is no remaining space on the same line with media stream 1214, the contents of the exemplary synchronized lines content viewer 1200 are scrolled up and media stream 1216 is inserted, as indicated by FIG. 12F. Because media stream 1210 and a portion of media stream 1212 occupied line 1206 prior to inserting media stream 1216, media stream 1210 and a part of media stream 1212 have been scrolled off the content viewer 1200 and deleted.

Similar to that described in regard to synchronized blocks content viewers, synchronized lines content viewers may be defined to enter text at the top of the content viewer and then scroll down. Alternatively, synchronized lines content viewers may also be defined to display text vertically, and insertion may be either from the left or right of the content viewer with horizontal scrolling.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for outputting at least one supplemental media stream designed to assist sense-impaired people in conjunction with a main media stream, the system comprising:

(a) a media stream output device that outputs a main media stream and a supplemental media stream, wherein the supplemental media stream comprises captioning that displays in textual format either dialog of characters that are being displayed in the main media stream or sounds of events that occur in the main media stream;

(b) a timing module that monitors the timing of the output of the main media stream and generates triggering events associated with the timing of the output of the main media stream; and (c) a media stream manager communicatively coupled to the media stream output device and to the timing module, and that:

(i) obtains the main media stream;

(ii) outputs the main media stream via the media stream output device;

(iii) monitors for and detects triggering events associated with the timing of the output of the main media stream generated by the timing module; and (iv) upon detecting a triggering event:

(A) determines that the supplemental media stream is associated with the triggering event
and determines whether the supplemental media stream includes information indicating that the supplemental media stream is to be output synchronously or asynchronously
and upon determining that the information indicates that the supplemental media stream is to be output asynchronously, outputs the supplemental media stream via the media stream output device such that the output of the main media stream is automatically suspended without user intervention while the supplemental media stream is output.

2. The system of claim 1, wherein the media stream manager initializes the timing module in conjunction with the output of the main media stream.

3. The system of claim 2, wherein the media stream manager initializes the timing module with an event table, the event table comprising a plurality of event entries, wherein each event entry identifies an associated supplemental media stream and a time during the output of the main media stream when the timing module is to generate a triggering event indicating the associated supplemental media stream is to be output.

4. The system of claim 1, wherein the media stream output device outputs a plurality of supplemental media streams, and wherein the media stream manager, upon detecting a triggering event, determines which of a plurality of supplemental media streams are associated supplemental media streams associated with the detected triggering event, and iteratively outputs the associated supplemental media streams via the media stream output device.

5. The system of claim 4, wherein iteratively outputting each associated supplemental media stream via the media stream output device comprises:

determining an order among the associated supplemental media streams; and iteratively outputting each associated supplemental media stream via the media stream output device according to the determined order.

6. The system of claim 5, wherein determining an order among the associated supplemental media streams comprises:

obtaining a priority value associated with each associated supplemental media stream; and ordering the associated supplemental media streams according to their associated priority values, the resultant order being the determined order.

7. The system of claim 4, wherein iteratively outputting the associated supplemental media streams via the media stream output device comprises:
   determining for each associated supplemental media stream whether the associated supplemental media stream is to be output synchronously or asynchronously to the main media stream; and
   iteratively outputting each associated supplemental media stream via the media stream output device either synchronously or asynchronously with the main media stream according to the results of the determinations.

8. The system of claim 7, wherein iteratively outputting each associated supplemental media stream either synchronously or asynchronously with the main media stream comprises suspending the output of the main media stream while an associated supplemental media stream is output asynchronously.

9. The system of claim 8, wherein iteratively outputting each associated supplemental media stream either synchronously or asynchronously with the main media stream further comprises causing the timing module to suspend the timing of the main media stream when the main media stream is suspended.

10. The system of claim 9, wherein iteratively outputting each associated supplemental media stream either synchronously or asynchronously with the main media stream further comprises terminating the output of any associated supplemental media stream being output when an associated supplemental media stream is output asynchronously.

11. The system of claim 10, wherein iteratively outputting each associated supplemental media stream either synchronously or asynchronously with the main media stream further comprises resuming output of the main media stream when the asynchronously output associated supplemental media stream terminates.

12. The system of claim 11, wherein iteratively outputting each associated supplemental media stream either synchronously or asynchronously with the main media stream further comprises causing the timing module to resume the timing of the main media stream when the asynchronously output associated supplemental media stream terminates.

13. The system of claim 8, wherein the timing module further monitors the timing of each associated supplemental media stream being output.

14. The system of claim 13, wherein the media stream manager initializes the timing module in conjunction with the output of each associated supplemental media stream.

15. The system of claim 8, wherein the supplemental media stream is an audio, visual, or compiled supplemental media stream.

16. The system of claim 15, wherein the compiled media stream comprises a compiled main media stream and a compiled supplemental media stream associated with the compiled main media stream, and wherein outputting the compiled media stream comprises:
   asynchronously outputting the compiled main media stream to the main media stream;
   monitoring for and detecting compiled triggering events while outputting the compiled main media stream; and
   upon detecting a compiled triggering event, determining that the compiled supplemental media stream is associated with the compiled triggering event and determining whether the compiled supplemental media stream is to be output synchronously or asynchronously with the compiled main media stream; and
   outputting the compiled supplemental media stream either synchronously or asynchronously with the compiled main media stream according to the results of the determination.

17. The system of claim 1, wherein the media stream manager outputs the main media stream via the media stream output device comprises:
   instantiating an output module for outputting the main media stream via the media stream output device according to the type of the main media stream;
   binding the main media stream to the output module; and
   causing the output module to output the main media stream via the media stream output device.

18. The system of claim 17, wherein the media stream manager outputs the supplemental media stream via the media stream output device comprises:
   instantiating an output module for outputting the supplemental media stream via the media stream output device according to the type of the supplemental media stream;
   binding the supplemental media stream to the output module; and
   causing the output module to output the supplemental media stream via the media stream output device.

19. The system of claim 18, wherein the output module is a Windows Media Viewer module.

20. The system of claim 18, wherein the output module is an audiovisual viewer.

21. The system of claim 18, wherein the output module is a block viewer.

22. The system of claim 18, wherein the output module is a scrolling line viewer.

23. The system of claim 18, wherein the output module is an audio output player.

24. A method for outputting at least one supplemental media stream designed to assist sense impaired people in conjunction with a main media stream, the method comprising:
   (a) obtaining a main media stream and a supplemental media stream for output on a media stream output device, wherein the supplemental media stream comprises captioning that displays in textual format either dialog of characters that are being displayed in the main media stream or sounds of events that occur in the main media stream;
   (b) initializing a timing module to perform timing of the output of the main media stream and to generate triggering events associated with the timing of the output of the main media stream;
   (c) outputting the main media stream via the media stream output device;
   (d) monitoring for and detecting triggering events associated with the timing of the output of the main media stream generated by the timing module; and
   (e) upon detecting a triggering event:
       (i) determining that the supplemental media stream is associated with the detected triggering event and determining whether the supplemental media stream includes information indicating that the supplemental media stream is to be output synchronously or asynchronously
       and upon determining that the information indicates that the supplemental media stream is to be output asynchronously, outputting the supplemental media stream via the media stream output device such that the output of the main media stream is automatically suspended without user intervention while the supplemental media stream is output.

25. The method of claim 24, wherein initializing the timing module to perform timing of the output of the main media stream and generate triggering events associated with the timing of the output of the main media stream comprises initializing the timing module with an event table, the event table comprising a plurality of event entries, and wherein each event entry identifies an associated supplemental media stream and a time during the output of the main media stream when the timing module is to generate a triggering event indicating the associated supplemental media stream is to be output.

26. The method of claim 25 further comprising, upon detecting a triggering event, determining which of a plurality of supplemental media streams are associated supplemental media streams associated with the detected triggering event, and iteratively outputting the associated supplement media streams via the media stream output device.

27. The method of claim 26, wherein iteratively outputting the associated supplemental media stream via the media stream output device further comprises:
  determining an order among the associated supplemental media streams; and
  iteratively outputting the associated supplemental media streams via the media stream output device according to the determined order.

28. The method of claim 27, wherein determining an order among the associated supplemental media streams further comprises:
  obtaining a priority value associated with each associated supplemental media stream; and
  ordering the associated supplemental media streams according to their associated priority values, the resultant order being the determined order.

29. The method of claim 26, wherein iteratively outputting the associated supplemental media streams via the media stream output device further comprises:
  determining for each associated supplemental media stream whether the associated supplemental media stream is to be output synchronously or asynchronously to the main media stream; and
  iteratively outputting each associated supplemental media stream via the media stream output device either synchronously or asynchronously with the main media stream according to the results of the determinations.

30. The method of claim 29, wherein iteratively outputting the associated supplemental media streams either synchronously or asynchronously with the main media stream further comprises suspending the output of the main media stream while an associated supplemental media stream is output asynchronously.

31. The method of claim 30 further comprising causing the timing module to suspend timing of the output of the main media stream when the output of the main media stream is suspended.

32. The method of claim 31 further comprising terminating the output of a supplemental media stream being output when an associated supplemental media stream is output asynchronously.

33. The method of claim 32 further comprising resuming the output of the main media stream when the asynchronously output associated supplemental media stream terminates.

34. The method of claim 33 further comprising causing the timing module to resume the timing of the output of the main media stream when the output of the main media stream resumes.

35. The method of claim 30 further comprising initializing the timing module to perform timing of the output of each associated supplemental media stream and to generate triggering events associated with the timing of the output of each associated supplemental media stream.

36. The method of claim 30, wherein the supplemental media stream is an audio, visual, or compiled supplemental media stream.

37. The method of claim 36, wherein the compiled media stream comprises a compiled main media stream and a compiled supplemental media stream associated with the compiled main media stream, and wherein outputting the compiled media stream comprises:
  asynchronously outputting the compiled main media stream to the main media stream;
  monitoring for and detecting compiled triggering events while outputting the compiled main media stream; and
  upon detecting a compiled triggering event:
    determining that the compiled supplemental media stream is associated with the compiled triggering event,
    and determining whether the compiled supplemental media stream is to be output synchronously or asynchronously with the compiled main media stream; and
    outputting the compiled supplemental media stream either synchronously or asynchronously with the compiled main media stream according to the results of the determination.

38. The method of claim 24, wherein initializing the output of the main media stream via the media stream output device comprises:
  instantiating an output module for outputting the main media stream via the media stream output device according to the type of the main media stream;
  binding the main media stream to the output module; and
  causing the output module to output the main media stream via the media stream output device.

39. The method of claim 38, wherein outputting the supplemental media stream via the media stream output device comprises:
  instantiating an output module for outputting the supplemental media stream via the media stream output device according to the type of the supplemental media stream;
  binding the supplemental media stream to the output module; and
  causing the output module to output the supplemental media stream via the media stream output device.

40. The method of claim 39, wherein the output module is a Windows Media Viewer module.

41. The method of claim 39, wherein the output module is an audiovisual viewer.

42. The method of claim 39, wherein the output module is a block viewer.

43. The method of claim 39, wherein the output module is a scrolling line viewer.

44. The method of claim 39, wherein the output module is an audio output player.

45. A computer-readable medium having computer-executable instructions for carrying out a method comprising the steps of:
  (a) obtaining a main media stream and a supplemental media stream for output on a media stream output devices, wherein the supple mental media stream comprises captioning that displays in textual format either dialog of characters that are being displayed in the main media stream or sounds of events that occur in the main media stream;

(b) initializing a timing module to perform the timing of the output of the main media stream and to generate triggering events associated with the timing of the output of the main media stream;

(c) outputting the main media stream via the media stream output device;

(d) monitoring for and detecting triggering events associated with the timing of the output of the main media stream generated by the timing module; and (e) upon detecting a triggering event:
  (i) determine that a supplemental media stream is associated with the detected triggering event
  and determine whether the supplemental media stream includes information indicating that the supplemental media stream is to be output synchronously or asynchronously
  and upon determining that the information indicates that the supplemental media stream is to be output asynchronously, output the supplemental media stream via the media stream output device such that the output of the main media stream is automatically suspended without user intervention while the supplemental media stream is output.

46. The computer-readable medium of claim 45 further comprising, upon detecting a triggering event, determining which of a plurality of media streams are associated supplemental media streams associated with the detected triggering event, and iteratively outputting the associated supplemental media streams via the media stream output device.

47. The computer-readable medium of claim 46, wherein iteratively outputting the associated supplemental media stream via the media stream output device further comprises:
  determining an order among the associated supplemental media streams; and
  iteratively outputting the associated supplemental media stream via the media stream output device according to the determined order.

48. The computer-readable medium of claim 47, wherein iteratively outputting the associated supplemental media streams either synchronously or asynchronously with the main media stream further comprises suspending the output of the main media stream while an associated supplemental media stream is output asynchronously.

49. The computer-readable medium of claim 46, wherein iteratively outputting the associated supplemental media streams via the media stream output device further comprises:
  determining for each associated supplemental media stream whether the associated supplemental media stream is to be output synchronously or asynchronously to the main media stream; and
  iteratively outputting each associated supplemental media stream via the media stream output device either synchronously or asynchronously with the main media stream according to the results of the determinations.

50. The computer-readable medium of claim 49, wherein the supplemental media stream is an audio, visual, or compiled supplemental media stream.

51. The computer-readable medium of claim 50, wherein the compiled media stream comprises a compiled main media stream and a compiled supplemental media stream associated with the compiled main media stream, and wherein outputting the compiled media stream comprises:
  asynchronously outputting the compiled main media stream to the main media stream;
  monitoring for and detecting compiled triggering events while outputting the compiled main media stream; and
  upon detecting a compiled triggering event:
    determining that the compiled supplemental media stream is associated with the compiled triggering event
    and determining whether the compiled supplemental media stream is to be output synchronously or asynchronously with the compiled main media stream; and
    outputting the compiled supplemental media stream either synchronously or asynchronously with the compiled main media stream according to the results of the determination.

52. The computer-readable medium of claim 51, wherein initializing the output of the main media stream via the media stream output device comprises:
  instantiating an output module for outputting the main media stream via the media stream output device according to the type of the main media stream;
  binding the main media stream to the output module; and
  causing the output module to output the main media stream via the media stream output device.

53. The computer-readable medium of claim 52, wherein outputting the supplemental media stream via the media stream output device further comprises:
  instantiating an output module outputting the supplemental media stream via the media stream output device according to the type of the supplemental media stream;
  binding the supplemental media stream to the output module; and
  causing the output module to output the supplemental media stream via the media stream output device.

54. A system for outputting at least one supplemental media stream designed to assist sense-impaired people in conjunction with a main media stream, the system comprising:
  (a) an output means to output a main media stream and a supplemental media stream, wherein the supplemental media stream comprises captioning that displays in textual format either dialog of characters that are being displayed in the main media stream or sounds of events that occur in the main media stream;
  (b) a timing means to monitor the timing of the output of the main media stream and generate triggering events associated with the timing of the output of the main media stream; and
  (c) a management means communicatively coupled to the output means and to the timing means to:
    (i) obtain the main media stream;
    (ii) output the main media stream via the output means;
    (iii) monitor for and detect triggering events associated with the timing of the output of the main media stream generated by the timing means; and
    (iv) upon detecting a triggering event:
      (A) determine that the supplemental media stream is associated with the triggering event
      and determine whether the supplemental media stream includes information indicating that the supplemental media stream is to be output synchronously or asynchronously
      and upon determining that the information indicates that the supplemental media stream is to be output asynchronously, output the supplemental media stream via the output means such that the output of the main media stream is automatically suspended without user intervention while the supplemental media stream is output.

55. The system of claim 54, wherein the management means initializes the timing means in conjunction with the output of the main media stream.

56. The system of claim 55, wherein the management means initializes the timing means with an event table, the event table comprising a plurality of event entries, wherein each event entry identifies an associated supplemental media stream and a time during the output of the main media stream when the timing means is to generate a triggering event indicating the associated supplemental media stream is to be output.

57. The system of claim 54, wherein the output means outputs a plurality of supplemental media streams, and wherein the management means, upon detecting a triggering event, determines which of a plurality of supplemental media streams are associated supplemental media streams associated with the detected triggering event, and iteratively outputs the associated supplemental media streams via the output means.

58. The system of claim 57, wherein iteratively outputting each associated supplemental media stream via the output means comprises:
   determining an order among the associated supplemental media streams; and
   iteratively outputting each associated supplemental media stream via the output means according to the determined order.

59. The system of claim 58, wherein determining an order among the associated supplemental media streams comprises:
   obtaining a priority value associated with each associated supplemental media stream; and
   ordering the associated supplemental media streams according to their associated priority values, the resultant order being the determined order.

60. The system of claim 57, wherein iteratively outputting the associated supplemental media streams via the output means comprises:
   determining for each associated supplemental media stream whether the associated supplemental media stream is to be output synchronously or asynchronously to the main media stream; and
   iteratively outputting each associated supplemental media stream via the output means either synchronously or asynchronously with the main media stream according to the results of the determinations.

61. The system of claim 60, wherein iteratively outputting each associated supplemental media stream either synchronously or asynchronously with the main media stream comprises suspending the output of the main media stream while an associated supplemental media stream is output asynchronously.

62. The system of claim 61, wherein iteratively outputting each associated supplemental media stream either synchronously or asynchronously with the main media stream further comprises causing the timing means to suspend the timing of the main media stream when the main media stream is suspended.

63. The system of claim 61, wherein the timing means further monitors the timing of each associated supplemental media stream being output.

64. The system of claim 63, wherein the management means initializes the timing means in conjunction with the output of each associated supplemental media stream.

65. The system of claim 61, wherein the supplemental media stream is an audio, visual, or compiled supplemental media stream.

66. The system of claim 65, wherein the compiled media stream comprises a compiled main media stream and a compiled supplemental media stream associated with the compiled main media stream, and wherein outputting the compiled media stream comprises:
   asynchronously outputting the compiled main media stream to the main media stream;
   monitoring for and detecting compiled triggering events while outputting the compiled main media stream; and
   upon detecting a compiled triggering event, determining that the compiled supplemental media stream is associated with the compiled triggering event
   and determining whether the compiled supplemental media stream is to be output synchronously or asynchronously with the compiled main media stream; and
   outputting the compiled supplemental media stream either synchronously or asynchronously with the compiled main media stream according to the results of the determination.

67. The system of claim 54, wherein the management means outputs the main media stream via the output means comprises:
   instantiating a stream output means for outputting the main media stream via the output means according to the type of the main media stream;
   binding the main media stream to the stream output means; and
   causing the stream output means to output the main media stream via the output means.

68. The system of claim 67, wherein the management means outputs the supplemental media stream via the output means comprises:
   instantiating a stream output means for outputting the supplemental media stream via the output means according to the type of the supplemental media stream;
   binding the supplemental media stream to the stream output means; and
   causing the stream output means to output the supplemental media stream via the output means.

* * * * *